US012742090B2

(12) United States Patent
Catchmark et al.

(10) Patent No.: US 12,742,090 B2
(45) Date of Patent: Sep. 22, 2026

(54) POLYMER COMPOSITIONS AND COATINGS

(71) Applicant: The Penn State Research Foundation, University Park, PA (US)

(72) Inventors: Jeffrey M. Catchmark, State College, PA (US); Adam Ross Plucinski, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 365 days.

(21) Appl. No.: 18/242,946

(22) Filed: Sep. 6, 2023

(65) Prior Publication Data

US 2024/0101854 A1 Mar. 28, 2024

Related U.S. Application Data

(60) Continuation of application No. 17/090,593, filed on Nov. 5, 2020, now Pat. No. 11,781,032, which is a (Continued)

(51) Int. Cl.
*C09D 101/28* (2006.01)
*C08K 3/26* (2006.01)
*C08L 1/02* (2006.01)
*C08L 89/00* (2006.01)
*C09D 105/00* (2006.01)
(Continued)

(52) U.S. Cl.
CPC ............ *C09D 101/286* (2013.01); *C08K 3/26* (2013.01); *C08L 1/02* (2013.01); *C08L 89/005* (2013.01); *C09D 105/00* (2013.01); *C09D 105/08* (2013.01); *D21H 11/18* (2013.01); *D21H 17/22* (2013.01); *D21H 17/25* (2013.01); *D21H 17/68* (2013.01); *D21H 19/40* (2013.01); *D21H 19/50* (2013.01)

(58) Field of Classification Search
None
See application file for complete search history.

(56) References Cited

U.S. PATENT DOCUMENTS 2,444,124 A 6/1948 Wedler
3,122,479 A 2/1964 Smith
(Continued)

FOREIGN PATENT DOCUMENTS

DE 10200470 A1 7/2003
EP 0544359 A2 11/1992
(Continued)

OTHER PUBLICATIONS

Barany et al., "Effect of polyelectrolyte mixtures on the electrokinetic potential and kinetics of flocculation of clay mineral particles," Colloids and Surfaces A: Physicochem. Eng. Aspects, Jun. 2011, 383:48-55.

(Continued)

*Primary Examiner* — Colin W. Slifka
(74) *Attorney, Agent, or Firm* — Fish & Richardson P.C.

(57) ABSTRACT

This document provides polymer compositions (e.g., biopolymer compositions) and coatings. For example, methods and materials related to polymer compositions (e.g., biopolymer compositions) and coatings as well as methods and materials for making and using such compositions (e.g., biopolymer compositions) and coatings are provided.

20 Claims, 4 Drawing Sheets

Related U.S. Application Data division of application No. 16/222,717, filed on Dec. 17, 2018, now abandoned, which is a division of application No. 14/894,914, filed as application No. PCT/US2014/046682 on Jul. 15, 2014, now Pat. No. 10,202,517.

(60) Provisional application No. 61/858,992, filed on Jul. 26, 2013.

(51) Int. Cl.

| | |
|---|---|
| ***C09D 105/08*** | (2006.01) |
| ***D21H 11/18*** | (2006.01) |
| ***D21H 17/22*** | (2006.01) |
| ***D21H 17/25*** | (2006.01) |
| ***D21H 17/68*** | (2006.01) |
| ***D21H 19/40*** | (2006.01) |
| ***D21H 19/50*** | (2006.01) |

(56) References Cited

U.S. PATENT DOCUMENTS 4,664,105 A 5/1987 Dautzenberg et al.
4,745,058 A 5/1988 Townsley
4,891,317 A 1/1990 Brown et al.
4,912,049 A 3/1990 Farah
4,925,530 A 5/1990 Sinclair et al.
4,962,030 A 10/1990 Kawai
5,104,487 A 4/1992 Taggart et al.
5,185,062 A 2/1993 Begala
5,338,407 A 8/1994 Dasgupta
5,354,424 A 10/1994 Rha et al.
5,378,830 A 1/1995 Yeh
5,507,914 A 4/1996 Sarkar et al.
5,549,908 A 8/1996 Smith et al.
5,580,348 A 12/1996 Blaney et al.
5,756,337 A 5/1998 Dees
5,772,646 A 6/1998 Blaney et al.
5,811,381 A 9/1998 Emalfarb et al.
5,846,213 A 12/1998 Wan
5,935,844 A 8/1999 Matsumura et al.
5,955,326 A 9/1999 Bungay, III et al.
6,013,490 A 1/2000 Kouda et al.
6,031,148 A 2/2000 Hayes et al.
6,071,727 A 6/2000 Bungay et al.
6,090,996 A 7/2000 Li
6,132,759 A 10/2000 Schacht et al.
6,140,105 A 10/2000 Watanabe et al.
6,177,482 B1 1/2001 Cinelli et al.
6,387,506 B1 5/2002 Kawamura et al.
6,458,386 B1 10/2002 Schacht et al.
6,468,978 B1 10/2002 Esswein et al.
6,599,518 B2 7/2003 Oster et al.
6,800,282 B1 10/2004 Thomson et al.
RE38,792 E 9/2005 Ishihara et al.
6,989,034 B2 1/2006 Hammer et al.
7,041,868 B2 5/2006 Greene et al.
7,083,673 B2 8/2006 Bowden et al.
7,163,691 B2 1/2007 Knaack et al.
7,279,177 B2 10/2007 Looney et al.
7,309,232 B2 12/2007 Rutherford et al.
7,368,128 B2 5/2008 Qvist
7,399,483 B2 7/2008 Stimmeder
7,491,225 B2 2/2009 Weber et al.
7,645,874 B2 1/2010 Saferstein et al.
7,700,172 B2 4/2010 Renn
7,709,631 B2 5/2010 Harris et al.
7,732,655 B2 6/2010 Cullen et al.
7,785,682 B2 8/2010 Sato et al.
7,824,701 B2 11/2010 Binette et al.
7,833,790 B2 11/2010 Cullen et al.
10,202,517 B2 2/2019 Catchmark et al.
11,781,032 B2 10/2023 Catchmark et al.
2002/0028231 A1 3/2002 Hierlemann et al.
2002/0040134 A1 4/2002 Ishihara et al.
2002/0065409 A1 5/2002 Ishihara et al.
2002/0150604 A1 10/2002 Yi et al.
2002/0164724 A1 11/2002 Ishihara et al.
2003/0127209 A1 7/2003 Sandberg et al.
2004/0091978 A1 5/2004 Ishihara et al.
2004/0096509 A1 5/2004 Hutchens et al.
2004/0193088 A1 9/2004 Looney et al.
2004/0241436 A1 12/2004 Hsieh et al.
2005/0022956 A1 2/2005 Rodriguez et al.
2005/0037082 A1 2/2005 Wan et al.
2005/0257905 A1 11/2005 Shoseyov
2006/0142685 A1 6/2006 Addison et al.
2006/0149182 A1 7/2006 Cullen et al.
2006/0161089 A1 7/2006 Thierauf et al.
2007/0231271 A1 10/2007 de Souza
2007/0255193 A1 11/2007 Patel et al.
2008/0031934 A1 2/2008 MacPhee et al.
2008/0033093 A1 2/2008 Menceloglu et al.
2008/0033331 A1 2/2008 MacPhee et al.
2008/0033332 A1 2/2008 MacPhee et al.
2008/0033333 A1 2/2008 MacPhee et al.
2008/0064072 A1 3/2008 Wan et al.
2008/0107619 A1 5/2008 Scharf et al.
2008/0119930 A1 5/2008 Osada et al.
2008/0132820 A1 6/2008 Buckman et al.
2008/0280360 A1 11/2008 Kaplan et al.
2008/0305517 A1 12/2008 Griffin et al.
2009/0028927 A1 1/2009 Wan et al.
2009/0074837 A1 3/2009 Evans et al.
2009/0186071 A1 7/2009 Huey et al.
2009/0209897 A1 8/2009 Limaye et al.
2009/0220560 A1 9/2009 Wan et al.
2009/0252800 A1 10/2009 Wan et al.
2009/0275872 A1 11/2009 Addison et al.
2010/0022932 A1 1/2010 Therauf et al.
2010/0042197 A1 2/2010 Bodin et al.
2010/0111914 A1 5/2010 Zhang et al.
2010/0278893 A1 11/2010 Bodin et al.
2010/0297239 A1 11/2010 Gatenholm
2010/0317066 A1 12/2010 Hsiao et al.
2011/0021701 A1 1/2011 Bismarck et al.
2011/0086236 A1 4/2011 Catchmark et al.
2011/0110993 A1 5/2011 Chieffi et al.
2012/0043039 A1 2/2012 Paltakari et al.
2016/0122568 A1 5/2016 Catchmark et al.
2019/0112495 A1 4/2019 Catchmark et al.
2021/0054225 A1 2/2021 Catchmark et al.

FOREIGN PATENT DOCUMENTS

JP 2006-514843 A 5/2006
JP 2008-521393 A 6/2008
WO WO 2007/076407 A2 6/2008

OTHER PUBLICATIONS

Beldman, "The cellulose of Trichoderma viride," Eur. J. Biochem., Jan. 1985, 146:301-308.

Bell et al., "Cellulase Inhibitor in Grape Leaves," Botanical Gazette, Dec. 1960, 122(2):143-148.

Brockman et al., "A Multistep Chemical Modification Procedure to create DNA Arrays on Gold Surfaces for the Study of Protein-DNA Interactions with Surface Plasmon Resonance Imaging," J. Am. Chem. Soc., Aug. 1999, 121:8044-8051.

Coating Technology Handbook, 2nd ed., Satas et al. (ed)., Nov. 2001, 918 pages.

DE10200470, English Translation of Description and Claims from EPO, dated Dec. 11, 2013, 6 pages.

Extended European Search Report in European Appln. No. 14830206, dated Mar. 16, 2017, 6 pages.

Extended European Search Report in European Appln. No. 23211096.5, dated Mar. 11, 2024, 10 pages.

Fukuda, "Polyelectrolyte Complexes of Chitosan with Sodium Carboxymethylcellulose," Bull. Chem. Soc. Jpn., 1980, 53(4): 837-840.

(56) References Cited

OTHER PUBLICATIONS

GenBank Accession No. CAH61065, "alpha-S2 casein, partial [Bos taurus]," Nov. 14, 2006, 1 page.
GenBank Accession No. 1916449A, "alpha s2 casein A/B," Nov. 19, 1996.
GenBank Accession No. AAB47262, "kappa-casein, partial [Ovis aries]," Feb. 13, 1997, 1 page.
GenBank Accession No. AAB97519, "kappa-casein, partial [Bos taurus]," Aug. 27, 2010, 1 page.
GenBank Accession No. ABR10906, "beta-casein, partial [Bos taurus]," Aug. 13, 2007, 1 page.
GenBank Accession No. BAA00313, "alpha-s1-casein, partial [Bos taurus]," May 29, 2002, 1 page.
GenBank Accession No. CAA26983, "alpha-S2-casein [Ovis aries], " Mar. 13, 1995, 1 page.
GenBank Accession No. CAA34502, "beta casein [Ovis aries]," Mar. 1, 1991, 1 page.
GenBank Accession No. CAA39270, "beta-casein [*Homo sapiens*]," Oct. 7, 2008, 1 page.
GenBank Accession No. CAA43174, "kappa casein [Capra hircus]," Feb. 27, 1994, 1 page.
GenBank Accession No. CAA47048, "kappa casein [*Homo sapiens*]," Oct. 7, 2008, 1 page.
GenBank Accession No. CAA55185, "alpha sl casein [*Homo sapiens*], " Nov. 14, 2006, 1 page.
GenBank Accession No. CAB39313, "beta-casein [Capra hircus]," Jun. 26, 2007, 1 page.
GenBank Accession No. CAD45345, "alpha s1 casein [Capra hircus], " Nov. 14, 2006, 1 page.
GenBank Accession No. NP_001009795, "alpha-S1-casein precursor [Ovis aries]," Nov. 10, 2011, 1 page.
GenBank Accession No. NP_809186, "hypothetical protein BT_0273 [Bacteroides thetaiotaomicron VPI-5482]," Jan. 20, 2012, 1 page.
Gupta et al., "Microbial keratinases and their prospective applications: an overview," Appl. Microbiol. Biotechnol., Mar. 2006, 70(1):21-33.
Hornung et al., "Optimizing the Production of Bacterial Cellulose in Surface Culture: Evaluation of Product Movement Influences on the Bioreaction (Part 2)," Engineering Life Sci., Dec. 2006, 6(6):546-551.
International Preliminary Report on Patentability in International Appln. No. PCT/US2009/066845, mailed on Jun. 16, 2011, 8 pages.
International Preliminary Report on Patentability in International Appln. No. PCT/US2010/052504, mailed on Apr. 26, 2012, 7 pages.
International Preliminary Report on Patentability in International Appln. No. PCT/US2014/046682, mailed on Feb. 4, 2016, 8 pages.
International Search Report and Written Opinion in International Appln. No. PCT/US2009/066845, mailed on Aug. 16, 2010, 10 pages.
International Search Report and Written Opinion in International Appln. No. PCT/US2010/052504, mailed on Aug. 29, 2011, 13 pages.
International Search Report and Written Opinion in International Appln. No. PCT/US2014/046682, mailed on Nov. 18, 2014, 9 pages.
Jordan et al., "Surface Plasmon Resonance Imaging Measurements of DNA Hybridization Adsorption and Streptavidin/DNA Multilayer Formation at Chemically Modified Gold Surfaces," Analytical Chem., Dec. 1997, 69:4939-4947.
Kawaguchi et al., "Structures and activity of cellulase inhibitors enzymatically synthesized from cellooligosaccharides and 1-deoxynojirimycin," Biosci. Biotechnol. Biochem., Feb. 1996, 60(2):344-346.
Klechkovskaya et al., "Structure of Macromolecular Compounds Structure of cellulose Acetobacter xylinum," translated from Crystallography Reports, Sep. 2003, 48(5):813-820.
Kouda et al., "Effect of agitator configuration on bacterial cellulose productivity in aerated and agitated culture," J. Ferment. Bioeng., 1997, 83:371-376.
Li et al., "Enhancing Wet Cellulose Adhesion with Proteins," Ind. Eng. Chem. Res., Aug. 2005, 44:7398-7404.
Lynd et al., "Microbial Cellulose Utilization: Fundamentals and Biotechnology," Microbiology and Molecular Biology Reviews, Sep. 2002, 66(3):506-577.
Miller et al. "Preparation and characterization of the different types of collagen," Methods Enzymol., 1982, 82:33-64.
Nelson et al., "Near-Infrared Surface Plasmon Resonance Measurements of Ultrathin Films. 1. Angle Shift and SPR Imaging Experiments," Anal. Chem., Aug. 1999, 71:3928-3934.
Nishi et al., "The structure and mechanical properties of sheets prepared from bacterial cellulose," J. Material Sci., Sep. 1989, 25(6):2997-3001.
Rosca et al., "Interaction of chitosan with natural or synthetic anionic polyelectrolytes. 1. The chitosan-carboxymethylcellulose complex," Carbohydrate Polymers, Oct. 2005, 62: 35-41.
Ross et al., "Cellulose biosynthesis and function in bacteria," Microbiol. Mol. Biol. Rev., Mar. 1991, 55(1):35-58.
Schneider et al., "Influence of pH on wound-healing: a new perspective for wound-therapy?" Arch. Dermatol. Res., Feb. 2007, 278:413-420.

POLYMER COMPOSITIONS AND COATINGS

CROSS-REFERENCE TO RELATED APPLICATION

This application is a continuation of U.S. application Ser. No. 17/090,593, filed Nov. 5, 2020, which is a divisional of U.S. application Ser. No. 16/222,717, filed Dec. 17, 2018, which is a divisional of U.S. application Ser. No. 14/894,914, filed Nov. 30, 2015 (now U.S. Pat. No. 10,202,517), which is a National Stage Application under 35 U.S.C. § 371 and claims the benefit of International Application No. PCT/US2014/046682, filed Jul. 15, 2014, which claims priority to U.S. Provisional Application No. 61/858,992, filed Jul. 26, 2013. The disclosures of the foregoing applications are hereby incorporated by reference in their entirety.

STATEMENT AS TO FEDERALLY SPONSORED RESEARCH

This invention was made with government support under Grant No. 2007-35504-18339 awarded by the USDA, Contract No. 11-JV-11111129-121 awarded by the USDA Forest Service and Hatch Act Project No. PEN04436 awarded by the USDA. The Government has certain rights in the invention.

BACKGROUND

1. Technical Field

This document relates to polymer compositions (e.g., biopolymer compositions) and coatings. For example, this document provides methods and materials related to polymer compositions (e.g., biopolymer compositions) and coatings as well as methods and materials related to blending one or more cationic polymers with one or more anionic polymers to obtain polymer compositions (e.g., biopolymer compositions) and coatings.

2. Background Information

Polysaccharides and polypeptides are common components of living organisms that can be obtained in large quantities. For example, cellulose is an abundant polysaccharide found in plant matter. Cellulose is a renewable material produced biologically in a natural process that consumes and stores carbon dioxide without the need for high temperature and high energy consuming processes. Cellulose is a major constituent of paper and cardboard, and of textiles made from cotton, linen, and other plant fibers. Casein is a polypeptide that accounts for a large percentage of the polypeptides found in milk and cheese products.

SUMMARY

This document provides polymer compositions (e.g., biopolymer compositions) and coatings. For example, this document provides methods and materials related to polymer compositions (e.g., biopolymer compositions) and coatings as well as methods and materials for making and using such compositions (e.g., biopolymer compositions) and coatings. In some cases, a polymer composition provided herein can be made by blending one or more cationic polymers with one or more anionic polymers to obtain a polymer composition or coating.

The composites and coatings provided herein can be used to produce products derived from wood. For example, the composites and coatings provided herein can be used to produce cardboard products, particleboard products, and paper products. In some cases, the composites and coatings provided herein can be used to produce a coating layer (e.g., an inner coating layer or an outer coating layer) for a cardboard product, particleboard product, or paper product. Such coatings can allow wood or paper product manufacturers to produce products having a desirable outer surface such as those found on high quality printing paper.

In some cases, the composites and coatings provided herein can be used to produce health care products and medical implants. For example, the composites and coatings provided herein can be used to produce wound care or tissue engineering products (e.g., nerve, bone, or cartilage tissue scaffolds or injectable implant materials having osteoinductive and/or bioabsorbable properties).

In one aspect, this document features a polymer blend composition comprising, or consisting essentially of, one or more cationic polymers and one or more anionic polymers, wherein the cationic polymers and the anionic polymers are combined in a polar solution with a pH between the lowest pKa of the anionic end group and the highest pKa of the cationic end group of the cationic polymers and the anionic polymers, wherein the cationic polymers and the anionic polymers were vigorously blended to obtain the polymer blend, and wherein the viscosity or particle size of the cationic polymers and the anionic polymers is reduced after the blending.

In another aspect, this document features a coating composition comprising one or more cationic polymers and one or more anionic polymers, wherein the cationic polymers and the anionic polymers were combined in a polar solution and vigorously blended such that the viscosity or particle size of the mixed polymers was reduced after blending.

In another aspect, this document features a composite composition comprising, or consisting essentially of, a substrate coated with a coating material comprising one or more cationic polymers and one or more anionic polymers, wherein the cationic polymers and the anionic polymers were combined in a polar solution and vigorously blended such that the viscosity or particle size of the mixed polymers was reduced after blending.

In another aspect, this document features a composite composition comprising, or consisting essentially of, a substrate and a material comprising one or more cationic polymers and one or more anionic polymers, wherein the cationic polymers and the anionic polymers were combined in a polar solution and vigorously blended such that the viscosity or particle size of the mixed polymers was reduced after blending.

In another aspect, this document features an adhesive material composition comprising, or consisting essentially of, one or more cationic polymers and one or more anionic polymers, wherein the cationic polymers and the anionic polymers were combined in a polar solution and vigorously blended such that the viscosity or particle size of the mixed polymers was reduced after blending.

In another aspect, this document features an adhesive material composition comprising, or consisting essentially of, one or more cationic polymers, one or more anionic polymers, and one or more clay mineral powders, wherein the cationic polymers and the anionic polymers were combined in a polar solution and vigorously blended such that the viscosity or particle size of the mixed polymers was reduced after blending, and wherein the one or more clay mineral powders were added to the blended polymers.

In another aspect, this document features a composite composition comprising, or consisting essentially of, two or more substrates joined by a material comprising one or more cationic polymers and one or more anionic polymers, wherein the cationic polymers and the anionic polymers were combined in a polar solution and vigorously blended such that the viscosity or particle size of the mixed polymers was reduced after blending.

In these above aspects, the cationic or anionic polymer can be a polysaccharide or protein. For example, the cationic polymer can be a cationic polysaccharide such as chitosan, a cationic guar gum, or a cationic starch. In another example, the anionic polymer can be an anionic polysaccharide such as carboxymethyl cellulose, an anionic starch, an alginate, an hyaluronate, a pectin, a carrageenan, a xanthan gum, a sulfated dextran, another cellulose or polysaccharide derivative, or an oxidized cellulose. In some cases, the cationic or anionic polymer can be a cationic or anionic protein selected from the following based on the pH of the blending solution and the isoelectric point of the protein: collagen, casein, keratin, wheat protein (e.g., wheat germ), silk protein, soy, corn gluten and the like. In some cases, a protein can be modified to change its charge, i.e., made more cationic as described in EP Patent Application No. 0544359 A2. In some cases, the substrate can contain at least 10% cellulose. The substrate can contain roughly about 0.5 to about 10% of a clay mineral. In some cases, the substrate can contain at least about 10% of a clay material. The clay mineral can be in the form of montmorillonite, kaolinite, or bentonite. Kaolin and bentonite are generally anionic (Colloids and Surfaces A: *Physicochem. Eng. Aspects,* 383:48-55 (2011)). In some cases, the clay mineral can be mixed with either the anionic or cationic polymer before final blending with the remaining polymer, or after blending of the anionic and cationic polymers where a second blending would generally be performed. The polar solution can comprise water and formic acid adjusted to a pH of about 3-4.

In another aspect, this document features a method for producing a composite or coating composition. The method comprises, or consists essentially of, (a) combining one or more cationic polymers with one or more anionic materials (e.g., one or more anionic micro- or nano-materials) to obtain a mixture, (b) combining one or more anionic polymers in a polar solution with the mixture to obtain a solution, and (c) vigorously blending the solution to produce the composite or coating composition. In some cases, the anionic material can be nano-cellulose, a nano-clay, or a nano-mineral.

In another aspect, this document features a method for producing a composite or coating composition. The method comprises, or consists essentially of, (a) combining one or more anionic polymers with one or more anionic micro- or nano-materials to obtain a mixture, (b) combining one or more cationic polymers in a polar solution with the mixture to obtain a solution, and (c) vigorously blending the solution to produce the composite or coating composition. The anionic micro- or nano-material can be nano-cellulose. The anionic micro- or nano-material can be a nano-clay or nano-mineral. In another aspect, this document features a composite composition comprising, or consisting essentially of, at least 10% cellulose and purified casein polypeptide, wherein the composition was formed from a polar solution comprising the cellulose, the casein polypeptide, and at least 50% (w/w) polar solvent, and wherein the composition was heated to at least 60° C. for at least one minute while hydrated.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
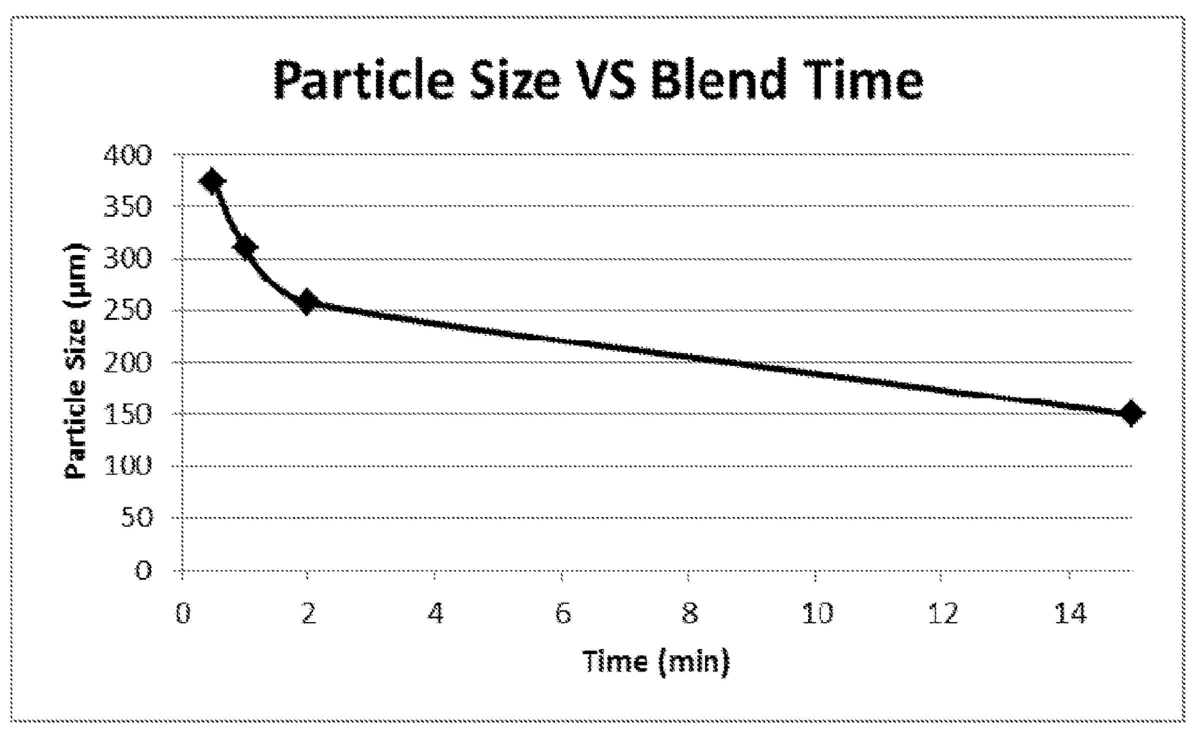
FIG. 1 is a graph plotting particle size (μm) as a function of blend time (minutes).

This document provides polymer compositions (e.g., biopolymer compositions) and coatings. For example, this document provides methods and materials related to polymer compositions (e.g., biopolymer compositions) and coatings as well as methods and materials for making and using such compositions (e.g., biopolymer compositions) and coatings. As described herein, a substrate material can be coated with a polymer blend in a solution (e.g., an aqueous or polar solution) to provide the substrate with improved wet strength and/or improved liquid barrier properties. In some cases, a polymer blend coating provided herein can improve the adhesion properties of the substrate such that it exhibits improved adhesion to another substrate.

Any appropriate substrate material can be coated or combined with a polymer composition or coating provided herein. For example, substrate materials in the form of sheets, particles, fibers, chips, flakes, foams or other shapes, or combinations thereof can be coated or combined with a polymer composition or coating provided herein. In some cases, a substrate material to be coated or combined with a polymer composition or coating provided herein can include, without limitation, polysaccharides (e.g., cellulose, microbial cellulose, bacterial cellulose, bacterial cellulose in spherical form, cellulose pulp, cellulose derivatives, carboxymethyl cellulose, methocel, chitin, chitin derivatives, chitosan, starch, starch derivatives, alginate, carrageenan such as kappa, iota, lambda, or other carrageenan variations, pectin, xanthan, gum arabic, konjac, gellan, locust bean, karaya, pullulan, furcellaran, and/or plant hemicelluloses such as xylan, glucuronoxylan, arabinoxylan, glucomannan, or xyloglucan), animal derived material (e.g., wool and/or collagen), proteins (e.g., casein such as kappa casein, alpha casein, beta casein, casein micelles, whey, collagen, gelatin, zein, soya, and/or gluten), lignins, minerals (e.g., calcium carbonate, talc, gypsum, calcium phosphate, and/or fluorite), clays (e.g., kaolinite, montmorillonite, illite, and/or chlorite (phyllosilicates)), calcium silicates, calcium silicate hydrates (e.g., cement compositions), lignocellulose (e.g., material produced from plant feedstocks that contain cellulose, lignin, hemicelluloses, pectin, protein, minerals, or other components depending upon type of plant, including wood, cotton, hemp, jute, flax, ramie, and sisal), or a combination thereof. In some cases, a substrate can be one or more microbes such as a bacterium, algae, or fungi. In some cases, a substrate material to be coated or combined with a polymer composition or coating provided herein can be particles or can be composed of particles having a size ranging from about 5 nm to 10 mm (e.g., from about 5 nm to 10 mm, from about 5 nm to 5 mm, from about 5 nm to 1 mm, from about 5 nm to 0.5 mm, from about 5 nm to 0.1 mm, from about 50 nm to 10 mm, from about 100 nm to 10 mm, from about 500 nm to 10 mm, from about 1 μm to 10 mm, from about 10 m to 10 mm, or from about 100 μm to 10 mm) in length. In some cases, a substrate material to be coated or combined with a polymer composition or coating provided herein can be particles or can be composed of particles having an average diameter ranging from about 5 nm to 10 mm (e.g., from about 5 nm to 10 mm, from about 5 nm to 5 mm, from about 5 nm to 1 mm, from about 5 nm to 0.5 mm, from about 5 nm to 0.1 mm, from about 50 nm to 10 mm, from about 100 nm to 10 mm, from about 500 nm to 10 mm, from about 1 μm to 10 mm, from about 10 μm to 10 mm, or from about 100 μm to 10 mm). In some cases, a substrate material to be coated or combined with a polymer composition or coating provided herein can used dry or in a hydrated form.

A composite or polymer blend provided herein can include two or more polymers with at least one polymer exhibiting an affinity to at least one other polymer. In some cases, each polymer in the blend can exhibit an affinity to at least one other polymer in the blend. For example, the polymers can be polar or non-polar, and the affinity can be through an interaction such as hydrogen bonding, electrostatic bonding, ionic bonding (including ionic bonding between two polymers of the same kind such as, for example, pectin or alginate with added calcium), van der Waals bonding, hydrophobic bonding or interactions, covalent bonding (including bonding where a catalyst or initiator is included in the blend or the blend is exposed to a catalyst, initiator, or some form of energy), or any other kind of bonding or interaction that can connect two polymers. A polymer blend provided herein can include or consist of at least one cationic polymer such as a cationic protein (e.g., casein at a solution pH less than about 4.2) or a cationic polysaccharide (e.g., chitosan or a cationic starch), and at least one anionic polymer such as an anionic protein (e.g., casein at a pH greater than about 5) or an anionic polysaccharide (e.g., carboxymethylcellulose or an anionic starch). To produce a composite or coating provided herein, two or more polymers where at least one polymer exhibits an affinity to at least one other polymer can be vigorously blended prior to coating. For example, to produce a composite or coating provided herein, the at least one cationic polymer and the at least one anionic polymer can be vigorously blended prior to coating. The vigorous blending can reduce the polymer blend particle sizes, create a more uniform particle size distribution, and/or lower the viscosity of the polymer blend.

Generally hydrophilic polymers can create viscous solutions when concentrated in highly polar solutions such as water at levels above about 0.5% w/w to 5% w/w or more. In addition, the combination of two or more solutions that contain at least two different polymers that exhibit an affinity for each other (e.g., cationic and anionic polysaccharides that bind through electrostatic and/or ionic interactions) that can create a new solution that contains inhomogeneous aggregates that can be in the form of, for example, particles or fiber-like assemblies whose dimensions can vary widely and range from about 1 mm to about 10 mm or more. In some cases, such solutions can be viscous where the viscosity is about 2 to about 20 times or more than that of water. Creating a controlled and/or uniform coating on a substrate using a viscous and/or inhomogeneous solution can be difficult. For example, the use of such viscous and/or inhomogeneous solutions in spray coating instrumentation can result in a clogged spray apparatus. Inhomogeneous coating solutions may not deposit or spread evenly on the surface of substrates and create manufacturing difficulties and yield problems. Non-uniformities resulting from an inhomogeneous coating formulation can be experienced in other coating processes including, for example, gravure coating, reverse roll coating, knife over roll (gap) coating, metering rod (Meyer rod) coating, slot die (slot extrusion) coating, immersion (dip) coating, curtain coating, air knife coating, dip roll coating, calendaring process coating, lamination coating, or via spraying as described elsewhere (Coating Technology Handbook; Donatas Satas and Arthur A. Tracton, 2nd edition, 2001, Marcel Dekker, Inc., 270 Madison Ave., New York, N.Y. 10016).

The methods and materials provided herein can be used to resolve these difficulties. For example, homogenizing a solution containing two or more interacting polymers by vigorous mixing or blending prior to deposition as described herein can result in a homogeneous solution that can be deposited, spread, or applied evenly on a surface of a substrate, thereby minimizing manufacturing difficulties and yield problems. In some cases, a solution containing an anionic polymer such as carboxymethylcellulose can be added to a solution containing a cationic polymer such as chitosan. With or without gentle mixing, this solution can form large insoluble inhomogeneous aggregates in about 2 minutes to 10 minutes, which could not be easily sprayed, spread, or uniformly deposited onto a surface. To resolve this situation, the mixture can be blended either immediately, or after the components of the mixture are allowed to interact for a period of time ranging from about 5 minutes to 1 or more days (e.g., 5 minutes to 12 hours, 5 minutes to 10 hours, 5 minutes to 8 hours, 5 minutes to 6 hours, 5 minutes to 4 hours, 5 minutes to 2 hours, 5 minutes to 1 hour, 15 minutes to 8 hours, 15 minutes to 6 hours, 30 minutes to 5 hours, or 30 minutes to 3 hours), until a desired viscosity or particle size is reached. Blending can be achieved using, for example, a commercial blender where the mixing blade(s) or mixing element(s) are rotating at a speed of about 1000 RPM to 100,000 RPM or more (e.g., 1000 to 75,000 RPM, 1000 to 50,000 RPM, 1000 to 25,000 RPM, 1000 to 15,000 RPM, 1000 to 10,000 RPM, or 1000 to 5,000 RPM). This blending can result in the formation of particles that contain both an anionic polymer and a cationic polymer. These particles can be smaller than the aggregates of polymers formed when the two polymer-containing solutions are combined without such blending. In some cases, the viscosity of the mixture can be reduced by blending as the structure of the combined polymers or free polymers remaining in solution can be altered. Such alterations include, without limitation, a reduction of the molecular weight or size of the two polymer aggregates that may contain any number of the anionic and cationic polymers, or by reducing the molecular weight of the individual polymers, or both. In some cases, the viscosity can be reduced by blending as the interaction between polymers that are otherwise able to bind water through hydrogen bonding can be promoted. Interactions between polymers that preclude the binding and organization of water around the polymer can reduce hydrogel formation and can result in more free or bulk water and lower viscosity solutions. In some cases, blending as described herein can result in a more uniform suspension of the polymer mixture allowing more uniform coating of substrates. In some cases, blending as described herein can allow a higher level of solids to be suspended in a lower viscosity solution resulting in less solvent such as water being required to deliver a given amount of coating material. For volume coating applications such as paper coating, reduced water consumption can be beneficial. In some cases, by allowing the mixture to interact for a given period of time rather than blending immediately after mixing, the morphology and/or molecular weight of the aggregates formed can be modified. In some cases, vigorous blending can influence the association between particles during coating or dehydration. For example, after vigorous blending, formed particles can have surfaces with positively and negatively charged end groups that can associate or link after the coating process during dehydration and/or pressing. This may explain in part why dehydrated coatings containing a polymer blend described herein become insoluble in a polar solution.

The term "vigorously blended" as used herein refers to blending a mixture with sufficient force or energy to disrupt the morphology of the material or the molecular weight of the material such that the solution's viscosity or average particle size decreases.

As described herein, polypeptide-polysaccharide blends can be used as many polypeptides such as casein contain hydrophobic and hydrophilic regions, similar to surfactants. Upon forming the polymer blend as described herein, the hydrophobic portion of the polypeptide can allow the particle to be compatible with non-polar compositions. For example, a polysaccharide-casein polymer blend can be compatible as an additive to non-polar compositions or polymers such as, for example, poly lactic acid, polyethylene, or polystyrene. As described herein, such polypeptide-polysaccharide blends can be used as a coating on other substrates such as, for example, clay minerals, which can be more compatible as an additive to non-polar compositions or polymers such as, for example, poly lactic acid, polyethylene, or polystyrene. In this case, a more compatible additive can be one that exhibits an affinity to, or disperses better in, the composition or polymer to which it is added.

In some cases, one or more surfactants can be added to improve interface compatibility of the polymer blend as the hydrophilic region would generally prefer to interact with the hydrophilic polymers and the hydrophobic region would generally prefer to interact with non-polar compositions.

In one embodiment, such a composite can be produced using the following procedure. A solution containing between 1% and 6% (w/w) carboxymethylcellulose (CMC) in water can be mixed with a solution containing between 1% and 6% (w/w) of chitosan (CS) in water. Both solutions can be adjusted to a pH of about 2.5 to 5.5 using an acid solution such as formic acid. Other acids include, without limitation, acetic acid and hydrochloric acid. In some cases, an acid such as formic acid can be uses as it does not present an appreciable odor and generally less acid is required. The relative concentrations of the CS:CMC polymer blend can range from about 1:2 to 1:1 to 2:1. In some cases, the CS:CMC ratio can be between 0.75:1 and 1:0.75. Varying this ratio can allow the charge of the aggregates to be varied as described herein. For example, a mixture containing higher levels of cationic end groups associated with the cationic particles such as the amine groups in chitosan can result in particles having a more cationic net charge. In some cases, a mixture containing higher levels of anionic end groups associated with the anionic particles such as the carboxylic acid groups in carboxymethylcellulose can result in particles having a more anionic net charge.

In some cases, the mixture can be immediately blended for 1 minute to 20 minutes or more using a commercial blender such as a food processing blender where the blending blade or feature is rotating at a speed between about 2000 and 50,000 RPM. Higher blending times and/or speeds can result in smaller particle sizes. The mixture can then be spray coated onto the surface, or one or both sides, of a substrate such as those described herein. In some cases, the substrate can contain about 10% to 100% cellulose, but other substrates can be used as described herein such as clays and/or minerals. The total deposited mass of the coating can range from about 0.1% to 200% of the mass of the substrate. In some cases, the coating density can range from about $1\times10^{-4}$ g/mm$^3$ to about $1\times10^{-3}$ g/mm$^3$, or the coating surface density can range from about $5\times10^{-6}$ g/mm$^2$ to about $5\times10^{-5}$ g/mm$^2$. For cellulose containing sheets, optimal substrate densities can range from about $5\times10^{-4}$ g/mm$^3$ to about $5\times10^{-3}$ g/mm$^3$ or more. After coating, the sheet can be dehydrated at a temperature between 80° C. and 120° C. for about 5 minutes to about 5 hours (e.g., from about 5 minutes to about 3 hours, from about 5 minutes to about 2 hours, from about 5 minutes to about 1 hour, from about 15 minutes to about 1 hours, or from about 15 minutes to about 30 minutes). In some cases, the sheet can be pressed before or during dehydration at a pressure between about 20 psi and about 200 psi (e.g., between about 20 psi and about 150 psi, between about 20 psi and about 100 psi, between about 50 psi and about 200 psi, between about 100 psi and about 200 psi, or between about 50 psi and about 150 psi) for 1 minute to 5 minutes if before dehydration or for the length of the dehydration.

The pH of the coating solution can vary depending upon the application. In some cases, the pH of the solution can be about that of the lowest pH the coating is exposed to, up to a pH of about 6.0 to 6.5. In such cases, this can be in the pH range of about 2.5 to 6.5 (e.g., from about 3 to 4.5). In some cases, the selection of the anionic and cationic polymers, and, more specifically, the pKa of the anionic and cationic end groups associated with these polymers, can influence the selection of solution pH. For example, the pH of the solution can be adjusted to be between the pKa of the anionic and cationic end groups or similar to the pKa of the anionic end group. In some cases, the pH of the solution can be adjusted to be between the isoelectric points of the cationic and anionic polymers or similar to the isoelectric point of the anionic polymer.

In some cases, a polymer blend coating described herein can be made more flexible by adding a plasticizer to the polymer blend solution at a loading of about 1% w/w to 50% w/w (dry weight polymer blend:plasticizer weight). Examples of plasticizers that can be added to a blend described herein include, without limitation, glycerol, propylene glycol, polyethylene glycol, and sorbitol. A plasticizer can be added either before blending, or after blending where the solution can be mixed for about 1 to about 5 minutes before spraying or applying to a substrate.

In some cases, a composition provided herein can be produced by adding an anionic polymer, a cationic polymer, or both in a powdered form into a liquid medium while blending or just prior to blending.

A polymer blend composition provided herein can be used as a coating material in many coating processes including, without limitation, gravure coating, reverse roll coating, knife over roll (gap) coating, metering rod (Meyer rod) coating, slot die (slot extrusion) coating, immersion (dip) coating, curtain coating, air knife coating, dip roll coating, calendaring process coating, lamination coating, or via spraying as described elsewhere (Coating Technology Handbook; Donatas Satas and Arthur A. Tracton, 2nd edition, 2001, Marcel Dekker, Inc., 270 Madison Ave., New York, N.Y. 10016). In some cases, a coating process can include those where the substrate is contained in a resonator or chamber where it is agitated using air flow or physical means, and the coating solution is sprayed into the resonator allowing the substrate to be coated before leaving the resonator. In such cases, the resonator interior or air in the resonator interior can be heated to about 50° C. to about 125° C. or more to dehydrate the coating on the substrate while it is in the resonator. Such a process can be continuous and can be similar to a continuous process used in the wood fiber coating industry where, for example, urea formaldehyde is applied to the surface of wood fiber in such a resonator before being formed into sheets or boards by depositing the coated fiber onto a conveyor belt and pressing to form a sheet or board.

The application of a coating provided herein onto a substrate can allow the surface charge of the substrate to be changed allowing for improvements in the final coated substrate, which itself could be an additive to other improved composite materials. For example, coating minerals and/or clays as described herein can result in a cationic coating that improves binding of the coated anionic mineral and/or clay to cellulose, a cellulose-containing substrate, or other anionic composition.

In some cases, a cationic polymer such as a polysaccharide can be used to impart anti-microbial properties to the composite or coating. For example, a cationic polymer such as chitosan can be used to impart anti-microbial properties to the composite or coating. In some cases, an antimicrobial additive can be introduced into the blend at any point in the production process. An example of such an anti-microbial additive is polyhexamethylene biguanide (PHMB).

In some cases, applying a composite or coating provided herein to a substrate can influence one or more mechanical properties of the substrate. For example, application of a coating provided herein to cellulose fiber or wool fiber can increase the stiffness of the fiber, thereby improving the compression resistance of the fiber. In such cases, the fiber materials can maintain their density and shape over time and resist settling or crushing.

The composites and coatings provided herein as well as substrates containing such composites and coatings can be used as an insulation material for housing or clothing or as a tissue scaffold or wound care material, where maintaining porosity and/or wet mechanical strength of the material is desired. In some cases, the composites and coatings provided herein can be used to make coated paper products for food handling/storage or shipping, specialty paper such as that used for government or legal documents, paper used in construction such as that used in gypsum wallboard (drywall) production or insulation backing, coated pressed fiber composites such as pressed paper pulp products, coated fibers such as wood, wool, or cotton (cellulose) including cotton containing clothing or wool containing clothing or cellulose insulation materials, coatings for corrugated cardboard including cardboard already formed into products such as shipping boxes or loading palates, coatings for tiles (e.g., one or both sides) such as ceiling tiles that can contain compounds such as recycled materials, coatings for papers or other materials for making compostable pots for planting, coatings for preserving fruits, vegetables, or other solid gelatinous foods, or coatings on clays or minerals that can be in particle form and that can be used as additives in other coating or composite formulations.

In some cases, the composites and coatings provided herein can be used to coat one side of an absorbent pad such as a cellulose-containing pad where the pad is used to absorb moisture. An example of such a pad is a one-side coated cellulose pad used in hot food packaging such as french fries or other foods where it is desirable to absorb moisture to avoid condensation that can degrade the quality of the food but presents a barrier to moisture on one side as to avoid failure of the package or leaking of the package. An example of such a product is a cellulose pad coated on one side, or a pressed/molded cellulose pulp container that is coated on the outside.

In another example, the composites and coatings provided herein can be used to make disposable cellulose gloves or mitts that can be composed of cotton or paper, where the outside of the glove or mitt is coated to make the item resistant to liquids.

In another example, the composites and coatings provided herein can be used as an adhesive where the coating is applied between two substrates and is then subsequently dried where the two substrates are optionally pressed during drying. Such a coating can replace currently used synthetic adhesives or biopolymer adhesives such as starch and dextrin used in paper products. In some cases, an adhesive can be used to make molded cellulose or plant fiber products such as pressed molded trays, utensils, cup holders, or any such device or in any appropriate geometry.

In some cases, a polymer blend provided herein in the absence of a substrate can be used as a cosmetic compound either directly or in conjunction with other powders or cosmetic materials. In such cases, the compound can be powdered by mixing or milling at a temperature of about 50° C. to about 125° C., freeze drying, or spray drying. In some cases, such methods can be similar to those used to dehydrate mashed potatoes. In some cases, powdering can be used to obtain a composition suitable for long term storage or to prepare a polymer for other applications. In some cases, after blending, the pH of a multi-polymer solution can be changed by adding an acid and/or base. In some cases, a pH value nearing neutral can be desired for applications where the material may come into sustained contact with human tissue, such as applications where a polymer blend is used as, or a part of, a cosmetic compound, a wound care material, tissue scaffold, or other biomedical device, or when the polymer blend is used as a coating on a substrate where the final coated substrate is used as a cosmetic compound, wound care material, tissue scaffold, or other biomedical device.

In some cases, a polymer blend provided herein in the absence of a substrate can be fibers produced from the polymer blend using processes such as electrospinning. In some cases, the polymer blend can be added to other materials and solvents used for creating fibers using electrospinning.

This document also provides composites containing a multi-polymer additive. For example, a composite material can be produced by adding a polymer blend provided herein to one or more substrates described herein and processing the mixture. The polymer blend can include at least one cationic polymer such as a cationic polypeptide (e.g., casein at a solution pH less than about 4.2 or another cationic polypeptide) or cationic polysaccharide (e.g., chitosan, cationic starch, or another cationic polymer) and at least one anionic polymer such as an anionic polypeptide (e.g., casein at a pH greater than about 5, or another anionic polypeptide) or anionic polysaccharide (e.g., carboxymethyl cellulose, anionic starch, or another anionic polymer), where the anionic and cationic polymers are vigorously blended prior to mixing with the substrate as described herein. Any appropriate substrate material can be coated or combined with the polymer blend provided herein. For example, substrate materials in the form of sheets, particles, fibers, chips, flakes, foams or other shapes, or combinations thereof can be coated or combined with a polymer blend provided herein. In some cases, a substrate material can include, without limitation, polysaccharides (e.g., cellulose, microbial cellulose, bacterial cellulose, bacterial cellulose in spherical form, cellulose pulp, cellulose derivatives, carboxymethyl cellulose, methocel, chitin, chitin derivatives, chitosan, starch, starch derivatives, alginate, carrageenan such as kappa, iota, lambda, or other carrageenan variations, pectin, xanthan, gum arabic, konjac, gellan, locust bean, karaya, pullulan, furcellaran, and/or plant hemicelluloses such as xylan, glucuronoxylan, arabinoxylan, glucomannan, or xyloglucan), animal derived material (e.g., wool and/or collagen), proteins (e.g., casein such as kappa casein, alpha casein, beta casein, casein micelles, whey, collagen, gelatin, zein, soya, and/or gluten), lignins, minerals (e.g., calcium carbonate, talc, gypsum, calcium phosphate, and/or fluorite), clays (e.g., kaolinite, montmorillonite, illite, and/or chlorite (phyllosilicates)), calcium silicates, calcium silicate hydrates (e.g., cement compositions), lignocellulose (e.g., material produced from plant feedstocks that contain cellulose, lignin, hemicelluloses, pectin, protein, minerals, or other components depending upon type of plant, including wood, cotton, hemp, jute, flax, ramie, and sisal), or a combination thereof. In some cases, the sizes of these materials can range from about 5 nm to over 1 mm. The polymer blend can be hydrated at a level ranging from about 99% water content by weight to less than 10% water content by weight. Blending can be performed at polymer solids contents of 1% to 6% w/w or more in water or other polar solvent. Lower hydration levels can be achieved by dehydration of the polymer blend after blending and rehydration as desired. Dehydration processes include, without limitation, mixing or milling at a temperature of about 50° C. to 125° C., freeze drying, or spray drying as used, for example, to dehydrate mashed potatoes.

Hydrated, dehydrated, or powdered polymer blends can be added to one or more substrate materials and formed into a new substrate using any appropriate process such as injection molding, pressing, or extrusion. The amount of dry weight polymer blend in the final new substrate can range from about 1% w/w to about 99% w/w (e.g., a range from about 2% w/w to about 25% w/w).

The polymer blend composites can be made more flexible by adding 1% w/w to 50% w/w of a plasticizer such as glycerol, propylene glycol, polyethylene glycol, or sorbitol either before blending, or after blending, or after the composite solution is made where the solution then can be mixed for 1 to 5 minutes before forming the composite.

Other variations on the polymer blend can be produced. For example, a cationic polymer can be mixed with an anionic substrate where the resulting blend is still cationic. This mixture can be combined with an anionic polymer and blended vigorously. For example, an anionic clay or cellulose can be added to a cationic polymer where the resulting mixture remains cationic. The mixture can be added to an anionic polymer and vigorously blended.

In some cases, an anionic polymer can be mixed with an anionic substrate. This mixture can be combined with a cationic polymer and blended vigorously. For example, an anionic clay or cellulose can be added to an anionic polymer. The mixture can be added to a cationic polymer and vigorously blended.

This document also provides improved cellulose, wood fiber, or plant fiber (e.g., lignocellulose) composites. Such composites can be produced as follows. Purified mammalian milk casein can be added to a solution of cellulose, wood fiber, wood flour, wood flakes, or other plant fiber substrate at a loading level of about 1% w/w to about 50% w/w (substrate:water) and mixed at room temperature for 5 min to 6 hours or more. The final w/w ratio of casein to the substrate can range from 0.1:100 to 100:100. The mixture can then be pressed or molded at a pressure of about 100 psi to 10,000 psi at a temperature ranging from about 65° C. to 125° C. for 1 min to 30 minutes or more. The elevated temperature can cause the casein polypeptides to precipitate, and the pressure can cause the polypeptides to flow and become a matrix between components of the substrate. When cooled, the casein can become hard forming a stable composite.

Another formulation can be created by adding a cationic polymer to the substrate before adding casein. Casein is generally negatively charged, and cationic polymers such as chitosan bind wood fiber such as cellulose providing a positive surface for the casein to bind. The cationic polymer can be added to a level of about 0.1% to 5% w/w or more (cationic polymer:substrate).

Another formulation can be obtained by adding calcium carbonate, calcium phosphate, or any mineral, clay or compound that has an affinity to a protein, or 1-3 or more phosphorylated serine amino acids, to a casein solution before addition to the cellulose or plant fiber. The casein can bind the mineral or clay. This solution can be combined with the cellulose or plant fiber as described herein and then pressed or molded as described herein. The final weight ratio of the mineral or clay to total composite weight can range from about 5% w/w to about 50% w/w or more. The inclusion of the mineral or clay can impart improved toughness or impact resistance to fiber composites such as pressed wood fiber used for flooring or other construction applications.

In some cases, cellulose fiber or plant fiber can be made hydrophobic rendering them more compatible to other non-polar polymers. An example is the incorporation of cellulose or plant fiber into polylactic acid (PLA), poly(lactic-co-glycolic acid) (PLGA), polyhydroxyalkanoate (PHA), poly-3-hydroxybutyrate (PHB), polyethylene, polypropylene and polystyrene. Cellulose containing fiber or other substrates such as a mineral or clay can be made more hydrophobic by the process described herein where the fiber, mineral, or clay is exposed to casein in solution, with or without it first being exposed to a cationic polysaccharide such as chitosan, at a desired concentration level where the surface is either partially coated or fully coated (e.g., typically at a concentration of about 0.5% to about 5% w/w casein to fiber or other substrate), and then the solution can be raised to a temperature of about 65° C. to 125° C. for 5 minutes to 30 minutes. The casein can become more hydrophobic. The fiber can be nanoscale. This includes nanoscale cellulose known as cellulose nanofibers, cellulose nanocrystals, or cellulose nanowhiskers. These fibers range in size from about 5 nm to about 50 nm in diameter and 100 nm to 10,000 nm in length. In some cases, methods such as electrospinning can be used to prepare cellulose containing nanofibers where the length of the fibers can exceed 1 mm to 10 mm or more. This process can extend to other fillers that exhibit a positive surface charge or are positively functionalized. A positive surface charge can allow casein to bind to the surface.

A casein polypeptide can be a multi-subunit casein protein or can be a single casein subunit polypeptide such as $\alpha_{s1}$-, $\alpha_{s2}$-, β-, or κ-casein subunit. The amino acid sequence of a casein polypeptide can be as set forth in GenBank® as follows in Table 1.

TABLE 1

Casein subunits polypeptides.

| Casein subunit | GI # | Accession # |
|---|---|---|
| *Bos taurus* (cow) | | |
| alpha$_s$1 | 217533 | BAA00313 |
| alpha$_s$2 | 54144010 | CAH61065 |
| beta | 148767917 | ABR10906 |
| kappa | 2801548 | AAB97519 |
| *Homo sapien* | | |
| alpha$_s$1 | 854086 | CAA55185 |
| alpha$_s$2 | — | — |
| beta | 288098 | CAA39270 |
| kappa | 29676 | CAA47048 |
| *Ovis aries* | | |
| alpha$_s$1 | 57526469 | NP_001009795 |
| alpha$_s$2 | 732894 | CAA26983 |
| beta | 1211 | CAA34502 |
| kappa | 1840105 | AAB47262 |
| *Capra hircus* (goat) | | |
| alpha$_s$1 | 22796155 | CAD45345 |
| alpha$_s$2 | 448348 | 1916449A |
| beta | 4499833 | CAB39313 |
| kappa | 978 | CAA43174 |

In some cases, a polypeptide of a composite or coating provided herein can be obtained from naturally-occurring starting material or can be obtained recombinantly. For example, when casein polypeptides are used, milk can be used as a starting material to obtain large quantities of the casein polypeptides. In such cases, the milk can be obtained from any appropriate species including, without limitation, cows, pigs, goats, sheep, monkeys, and humans. Any appropriate cloning techniques and heterologous expression system technologies can be used to obtain a polypeptide recombinantly. For example, nucleic acid encoding a naturally-occurring κ-casein polypeptide or a polypeptide designed to contain one or more of the regions described herein can be inserted into an expression vector (e.g., a mammalian or bacterial expression vector) for expression in desired cells (e.g., mammalian or bacterial cells). Examples of such vectors include, without limitation, viral vectors and non-viral vectors. Once inserted into a cell, the vector can drive expression of large quantities of the encoded polypeptide, which can be purified using common purification techniques. For example, affinity chromatography can be used to purify recombinantly produced polypeptides. In some cases, an enzyme such as a protease can be used to cleave a particular polypeptide, and one or more of the cleavage products can be obtained and used to make a composite provided herein. For example, κ-casein, after binding to cellulose, can be cleaved by the enzyme chymosin to leave a bound polypeptide containing hydrophobic and aromatic amino acids that can be used to bind to polysaccharides and/or organic polymers.

As described herein, a composite or coating composition provided herein can include one or more polysaccharides (e.g., cellulose). Such polysaccharides can be homopolysaccharides or heteropolysaccharides and can contain two or more monosaccharide residues (e.g., glucose residues, mannose residues, galactose residues, fructose residues, arabinose residues and xylose residues). For example, the polysaccharides of a composite provided herein can include between 50 and 20,000 monosaccharide residues (e.g., between 50 and 15,000, between 50 and 10,000, between 50 and 5,000, between 50 and 2500, between 50 and 2,000, between 50 and 1,500, between 50 and 1,000, between 50 and 500, between 100 and 20,000, between 500 and 20,000, between 1,000 and 20,000, between 2,000 and 20,000, between 500 and 15,000, between 1,000 and 15,000, between 2,000 and 15,000, between 500 and 2,000, or between 500 and 1,000 monosaccharide residues). The polysaccharides of a composite provided herein can include any type of glycosidic bond (e.g., β-1,4 linkages, α-1,4 linkages, β-1,6 linkages, and α-1,6 linkages) or any combination of glycosidic bonds. Examples of polysaccharides that can be used to make a composite or coating provided herein include, without limitation, cellulose (e.g., plant, insect, or microbial cellulose), starch, chitin, fructan, amylose, amylopectin, glycogen, xanthan, mannan, galactomamman, xylan, glucuronoxylan, arabinoxylan, glucomannan, xyloglucan, glycosaminoglycans, modified starches, modified amylopectin, modified amylose, chitosan, guar gum, modified guar gum, locust bean gum, tara gum, konjac gum, konjac flour, fenugreek gum, mesquite gum, aloe mannans, modified cellulose such as carboxyalkylated cellulose and carboxymethyl cellulose, oxidized polysaccharides, sulfated polysaccharides, cationic polysaccharides, pectin, arabic gum, karaya gum, xanthan, kappa, iota or lambda carrageenans, agar-agar, alginates, guar gum, tara gum, locust bean gum, konjac, mesquite gum, and fenugreek extracts.

Polysaccharides can be obtained in the form of a liquid, gel, powder, matrix, or sphere-like particle. For example, cellulose can be used as described herein in the form of microcrystalline cellulose, microfibrillated cellulose, or hydrolyzed cellulose nanofibers or nanowhiskers, or sphere-like cellulose produced by bacteria including *Acetobacter xylinum*. Cellulose in sphere-like form can range in size from about 50 μm to about 25000 μm (e.g., 200 μm to 1000 μm, 500 μm to 5000 μm, or 1000 μm to 10000 μm).

Polysaccharides can be obtained from a naturally-occurring starting material or can be produced synthetically. For example, the polysaccharides of a composite provide herein can be obtained from plants (e.g., grasses and trees), animals (e.g., tunicates), or microbes (e.g., *Acetobacter xylinum* bacteria). In some cases, the polysaccharides of a composite provide herein can be obtained commercially. For example, various grades of cellulose can be obtained from paper and pulp manufacturers such as International Paper, Georgia Pacific, or Weyerhaeuser, or distributors such as Fluka, Sigma Aldrich, and other companies.

In some cases, a polysaccharide provided herein can exhibit various degrees of alignment. For example, cellulose fibrils can be aligned using a magnetic field, an electric field (e.g., a DC or AC electric field), an electromagnetic or optical field, or using fluid flow, where the long axis (along the α-1,4 glucan chain) of the fibrils are generally parallel. Such a configuration can be achieved by applying an electric field to a solution of cellulose fibers or to an active growing culture of microbes (such as the bacteria *Acetobacter xylinum*) producing cellulose. Such an arrangement can improve the physical properties of the cellulose or any cellulose containing materials and can be used in tissue regeneration applications where growing cells need to grow primarily in one dimension (e.g., along the fiber length). An example of such tissue is nerve tissue (e.g., spinal cord tissue after a break where the break is larger than about m to about 100 m). In another example, the methods and materials provided herein can be used to close a surgical wound such as that made during hernia repair or other surgeries.

In some cases, the cellulose provided herein can include nanofibers of cellulose (e.g., nanofibers measuring 2 nm to about 35 nm in diameter, 50 nm to 50,000 nm in length). The nanofibers can be created using microbes in a culture. The culture conditions can be such the temperature is cycled. For example, the temperature can periodically exceed the thermal stability of the cellulose synthase complex. In some cases, the cellulose nanofibers can be produced by culturing the bacteria *Acetobacter xylinum* in an agitated culture where the culture temperature is cycled as follows: the culture is maintained at 30° C. for 10 minutes to 12 hours, then the temperature is increased to 36° C. to 44° C. (e.g., between 40° C. to 42° C.) and held there for 1 minute to 6 hours (e.g., 5 minutes to 60 minutes). The high temperature can disrupt cellulose synthesis. The 30° C. temperature culture can allow the cellulose to grow normally.

In some cases, a composite or coating provided herein can include one or more non-polypeptide, non-polysaccharide molecules such as calcium-containing molecules, polyesters, or petroleum derived polymers. Examples of calcium-containing molecules include, without limitation, calcium phosphate, hydroxyapatite (HA), calcium carbonate, calcium hydroxide, calcium hypophosphite, calcium oxalate, calcium sulfate, calcium lactate, calcium fluoride, calcium silicate, calcium periodate, calcium sulphate, calcium aspartate, calcium carbide, calcium chloride, calcium cyclamate, calcium gluconate, calcium hypochlorite, calcium permanganate, calcium phosphide, calcium stearate, and calcium sulfate. Calcium-containing molecules can be obtained in any appropriate form such as a liquid, solid, powder, or granule. For example, calcium phosphate can be obtained in the form of an amorphous powder. Calcium-containing molecules can be obtained from naturally-occurring starting materials, can be synthetically produced, or can be obtained commercially. For example, HA can be obtained commercially from Sigma Aldrich. In some cases, a non-polypeptide, non-polysaccharide molecules can be a clay such as kaolin, bentonite, and other colloidal, non-colloidal, and plastic clays.

Examples of polyester and other polymer molecules include, without limitation, polylactic acid, poly(lactic-co-glycolic acid), polyhydroxybutyrate, polycaprolactone, polybutylene succinate, polyethylene, and polystyrene. Such polymers can be obtained in any appropriate form such as a liquid, solid, powder, or granule. For example, polyesters can be obtained in the form of granules or pellets. Polyester molecules can be obtained from a naturally-occurring starting material, can be synthetically produced, or can be obtained commercially. For example, polylactic acid can be synthetically produced from lactic acid using any appropriate method including, without limitation, oligomerization, dimerization, and/or ring-opening polymerization.

A composite or coating provided herein containing polypeptides attached to polysaccharides and non-polypeptide, non-polysaccharide molecules can include any of the following combinations of items: (a) cellulose, casein, and calcium phosphate; (b) cellulose, casein, and polylactic acid; (c) cellulose, casein, calcium phosphate, and polylactic acid; (d) cellulose, casein, and calcium carbonate; (e) cellulose, casein, and polyhydroxybutyrate; (f) cellulose, $\alpha_{s1}$-casein, calcium phosphate, and polylactic acid; (g) cellulose, $\alpha_{s2}$-casein, calcium phosphate, and polylactic acid; (h) cellulose, κ-casein, calcium phosphate, and polylactic acid; (i) cellulose, β-casein, calcium phosphate, and polylactic acid; (j) cellulose, $\alpha_{s1}$-casein, calcium carbonate, and polylactic acid; (k) cellulose, $\alpha_{s2}$-casein, calcium carbonate, and polylactic acid; (l) cellulose, κ-casein, calcium carbonate, and polylactic acid; (m) cellulose, β-casein, calcium carbonate, and polylactic acid; (n) cellulose, hydrophobic portion of κ-casein (amino acids 1-105), calcium phosphate, and polylactic acid; (o) cellulose, hydrophobic portion of κ-casein (amino acids 1-105), calcium carbonate, and polylactic acid; (p) cellulose, hydrophobic portion of κ-casein (amino acids 1-105), calcium phosphate, and polylactic acid; (q) cellulose, casein, and polyethylene; (r) cellulose, casein, calcium phosphate, and polyethylene; (s) cellulose, $\alpha_{s1}$-casein, and polyethylene; (t) cellulose, $\alpha_{s2}$-casein, and polyethylene; (u) cellulose, β-casein, and polyethylene; (v) cellulose, κ-casein, and polyethylene; (w) cellulose, $\alpha_{s1}$-casein, and polystyrene; (x) cellulose, $\alpha_{s2}$-casein, and polystyrene; (y) cellulose, β-casein, and polystyrene; (z) cellulose, κ-casein, and polystyrene; (aa) cellulose, casein, calcium phosphate, and polystyrene; (ab) cellulose, $\alpha_{s1}$-casein and κ-casein, calcium carbonate, and polyhydroxybutyrate; (ac) cellulose, $\alpha_{s1}$-casein and κ-casein, calcium phosphate, and polyhydroxybutyrate; (ad) cellulose, $\alpha_{s1}$-casein and κ-casein, calcium phosphate, and polylactic acid; and (ae) cellulose, $\alpha_{s1}$-casein and hydrophobic portion κ-casein (amino acids 1-105), calcium phosphate, and polylactic acid. In some cases, a composite provided herein can be designed to include any of the following combinations of items (a) casein and polylactic acid; (b) casein, calcium phosphate, and polylactic acid; (c) $\alpha_{s1}$-casein and polylactic acid; (d) $\alpha_{s2}$-casein and polylactic acid; (e) β-casein and polylactic acid; (f) κ-casein and polylactic acid; (g) hydrophobic portion κ-casein (amino acids 1-105), calcium phosphate, and polylactic acid; (h) casein and polyethylene; (i) casein, calcium phosphate, and polyethylene; (j) $\alpha_{s1}$-casein and polyethylene; (k) $\alpha_{s2}$-casein and polyethylene; (1) β-casein and polyethylene; (m) κ-casein and polyethylene; or (n) hydrophobic portion κ-casein (amino acids 1-105), calcium phosphate, and polyethylene.

In some cases, a composite or coating provided herein can have between about 1 mg and about 1 kg of a polypeptide, between about 1 mg and about 1 kg of a polysaccharide, and between about 1 mg and about 1 kg of a non-polypeptide, non-polysaccharide molecule. In some cases, a composite provided herein can have between 0.5 and 99 wt % of a polypeptide, between 0.5 and 99 wt % of a polysaccharide, and between 0.5 and 99 wt % of a non-polypeptide, non-polysaccharide molecule. For example, a composite provided herein can contain polypeptides, polysaccharides, and non-polypeptide, non-polysaccharide molecules in the following weight percentages: 40:40:20; 30:50:20; 50:30:20; 20:20:60; 5:15:60; or 15:5:60.

In one embodiment, a composite or coating provided herein containing a polypeptide attached to cellulose and a calcium-containing molecule can be synthesized by obtaining microbial cellulose in a static or agitated culture using bacteria such as *Acetobacter xylinum*. The culture can be washed with a basic solution (e.g., sodium hydroxide) to remove bacteria cells and media compounds. A polypeptide (e.g., whole milk bovine casein, $\alpha_{s1}$-casein, $\alpha_{s2}$-casein, β-casein, κ-casein, or the hydrophobic portion of κ-casein, amino acids 1-105) can be contacted with the microbial cellulose. The resulting mixture can be mixed for greater than or equal to 10 minutes (e.g., 30 minutes) to allow binding. The mixture can be washed repeatedly (e.g., 3 to 4 times) for 15 minutes on a rotor to remove unbound casein. The mixture can then be exposed to a temperature in excess of 65° C. or 70° C. for 30 minutes to 4 hours. A calcium phosphate solution (e.g., hydroxyapatite) can be introduced to the mixture. The solution can contain calcium phosphate particles in the size range of 5 nm to 1 micron. Any excess unbound calcium phosphate particles can be washed out.

In another embodiment, a composite or coating provided herein attached to cellulose can be synthesized by culturing microbial cellulose in a static or agitated culture using bacteria such as *Acetobacter xylinum* in the presence of the polymer blend, composite or coating. The culture can be washed with a basic solution (e.g., sodium hydroxide) to remove bacteria cells and media compounds. A polypeptide (e.g., whole milk bovine casein or $\alpha_{s1}$-casein) can be introduced into a calcium phosphate solution (e.g., hydroxyapatite) once a pH (e.g., a pH between 7.0 and 11.0 or a basic pH between 9.5 to 11.0) is achieved using NaOH and water. The solution can contain calcium phosphate particles in the size range of 5 nm to 1 micron. The solution can be mixed for 30 minutes to allow binding. The particles can be centrifuged repeatedly (e.g., 3-4 times) and washed to remove excess unbound casein. The functionalized calcium phosphate particles can be mixed with the microbial cellulose and rotored for 10-30 minutes to allow binding. The mixture can be washed repeatedly (e.g., 3-4 times) for 15 minutes on a rotor to remove excess unbound functionalized calcium phosphate particles.

The composites or coating provided herein can be designed to be in the form of a matrix, microsphere, coated fabric, liquid, hydrogel, dry coating, powder, foam, paste, cream, or injectable. In some cases, a composite provided herein can be in a form appropriate for injection into a human. For example, a composite provided herein can be a sterile hydrogel formulation. Such sterile hydrogel formulations can be used in combination with a syringe. In such cases, a unit dose can be provided in the syringe such that between about 0.5 mL to about 500 mL of a composite provided herein is delivered (e.g., between about 1 mL to about 50 mL, between about 2 mL to about 25 mL, between about 2 mL to about 10 mL, or between about 1 mL to about 10 mL). In some cases, a composite provided herein can be formulated into a bioabsorbable material. For example, a composite provided herein containing HA can be formulated into a patch that can be used as an osteoinductive tissue scaffold. Such patches can be used to promote bone growth within mammals (e.g., humans).

In some cases, a composite or coating provided herein can be formulated into a tissue scaffold specifically engineered to guide the direction of tissue growth. For example, a composite provided herein can contain aligned cellulose fibers.

In some cases, a composite or coating provided herein can be formulated to be a cosmetic compound. For example, a composite provided herein containing anionic and cationic polysaccharides, cellulose and casein, or cellulose, casein, and a mineral or clay can be used as a facial cream or paste. In this case, the cellulose or polysaccharide blend can help provide a final material coating where the coating smoothens the surface of the skin, reducing the appearance of wrinkles. The casein polypeptide containing hydrophobic amino acids can make the cellulose, minerals, or clay compatible or have an affinity for, the lipids or oily surface of the skin or other biological components positioned on the skin surface.

In some cases, a composite or coating provided herein can be used as a tissue regeneration material for applications such as skin, bone, cartilage, nerve, organ, animal muscle, or other tissues. The composition or coating provided herein can be formed with a three dimensional structure. For example, the composition can contain microbially produced polysaccharides where the shape of the polysaccharide material is formed using a template material, i.e., the microbially produced polysaccharide grows over and/or in between features of the template material to form a three dimensional structure. The template material can be degradable such that either as the polysaccharide is microbially produced or after the polysaccharide is formed, the template material can be removed. Non-microbially produced polysaccharides or polysaccharide compositions can be formed with a three dimensional structure using a template or degradable template. One example of a degradable template is poly(lactic-co-glycolic acid). This material can degrade in water. The degradation rate can be modified by changing the pH of a solution in which the material can be placed. For example, the degradation rate of poly(lactic-co-glycolic acid) can be increased over that of pure water by increasing the pH to a value of 8-12. The poly(lactic-co-glycolic acid) can be in the shape of spheres, fibers, or particles with a distribution of dimensions, i.e., diameters of 5 nanometers to 500 microns or in the case of fibers a diameter of 5 nanometers to 500 microns and a length of 100 nanometers to 10 millimeters or more. In some cases, a composite or coating provided herein can be used to produce an environmental remediation material, such as a material used to absorb oil spills. Hydrophobicity created by the incorporation of polypeptides or surfactants that contain hydrophobic residues can absorb more oil, especially when combined with microbial cellulose, which can exhibit extensive porosity and high surface area. One particular example is the use of the hydrophobic portion of κ-casein (called para-kappa casein, residues 1-105). In some cases the material can be used to absorb metal and metal alloy ions through binding to the phosphorylated residues of the polypeptide.

In some cases, a composite or coating provided herein can be used as a drug delivery device for enhancement of calcium delivery, delivery of other coated substrates or health related compounds, or bio-activity. For example, cellulose porosity and bio-compatibility after functionalized with casein can be injected with a pharmaceutical for controlled release in the body. Since cellulose is not digested by humans, casein hydrolysis in the digestive tract will allow for a timed-release of incorporated drug(s). In addition, an edible cellulose-casein-calcium supplement can provide desirable delivery or bio-availability of calcium as salivary enzymes break down the casein releasing the calcium for dental bone deposition or nutrient delivery.

In some cases, a composite or coating provided herein can be used as an improved fire retarding insulation, wallboard, filler, or clothing material. The incorporation of calcium containing molecules or clays, that exhibit good thermal degradation properties (e.g., high thermal degradation properties), onto the surface of cellulose materials, can improve the fire resistance and thermal degradation properties of the material.

In some cases, a composite or coating provided herein can be used as a foam where the stability of the foam can be improved through interactions of the polypeptides including disulfide bonding or ionic interactions including those associated with the phosphorylated amino acids which can bind through intermediate positively charged ions, molecules such as surfactants, or particles such as calcium, calcium phosphate, or metal ions. The production of the foam can be accomplished by introducing the ions, molecules, or particles during the foaming process. The polypeptides can include αS1-casein, αS2-casein, and β-casein polypeptides. Other polypeptides include those described herein as well as those that contain more than three hydrophobic amino acids and more than three phosphorylated amino acids per 10-20 amino acids.

In some cases, a composite or coating provided herein can be used to produce wood products (e.g., paper, photographic paper, cardboard, particle board, fiber board, wood chip board, packaging material, or a laminated, coated, or joined material). Wood products containing a composite or coating provided herein can have an extended life and increased recyclability thus reducing the consumption and energy requirements associated with processing such wood products. For example, the composites provided herein can be used to improve the mechanical properties of paper and/or reduce the fiber content in processed wood products. In some cases, a composite provided herein can be in a form appropriate for coatings other materials. For example, a composite provided herein can be a clay formulation. Such clay formulation can be used to coat wood processed products such as paper, packaging, cardboard, particle board, or solid wood products.

In some cases, a composite or blend provided herein can be in the form of a coating, or a composite provided herein can be a coated material. The coating can contain two or more oppositely charged polymers, polypeptides, or polysaccharides, in any combination. In some cases, a coating can improve the dry and wet mechanical strength of the substrate material, which can be a composite as described herein. In some cases, a coating can be made principally of cellulose and can have improved liquid barrier properties. An improved composite provided herein can be used for many applications including, without limitation, food packaging, shipping containers, backing for insulating material, or construction materials.

The invention will be further described in the following examples, which do not limit the scope of the invention described in the claims. In addition, the following examples do not limit further combinations of the materials described herein and other compositions capable of being created based on the inventions herein.

EXAMPLES

Example 1—CS:CMC Blend Solution

Preparation of Chitosan (CS) Solution

3% CS solution was made by adding 3 g chitosan (50-190 kDa, from Sigma-Aldrich) to 95.8 g of deionized water first, and then adding 1.2 g of formic acid (88%, Mallinckrodt Chemicals) drop wise into the mixture while magnetically stirring at 400 rpm. The mixture was stirred for one day to allow the chitosan to dissolve. The solution was sealed and stored in refrigerator. The pH of the 3% chitosan solution was around 3.

Preparation of Carboxymethyl Cellulose (CMC) Solution

3% CMC solution was made by adding 3 g CMC (90 kDa, from Sigma-Aldrich) to 96.65 g of deionized water and magnetically stirring at 400 rpm for one day. The mixture was stirred for one day then supplemented with 0.35 g of formic acid. The solution was sealed and stored in refrigerator. The pH of the 3% CMC solution was around 3.

Preparation and Characterization of CS+CMC Polymer Blend Coating Solution

Figure 2:
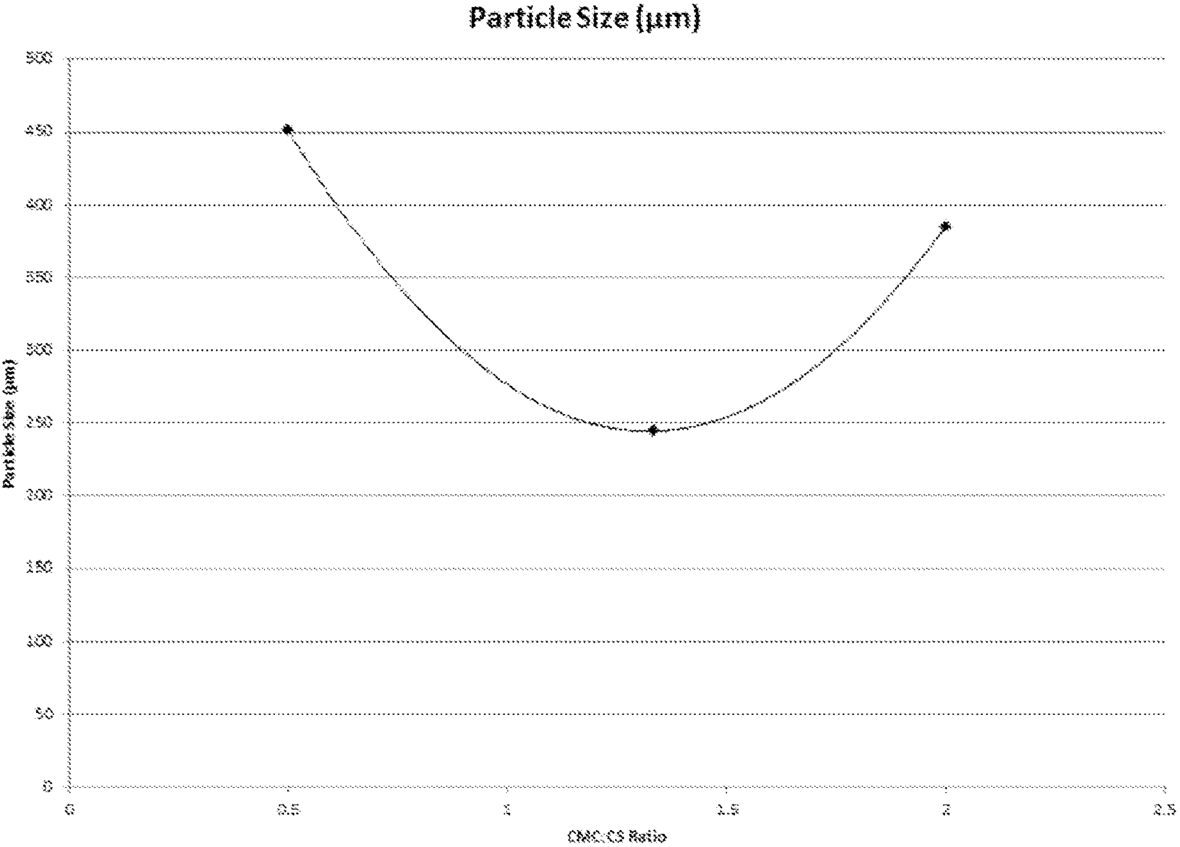
FIG. 2 is a graph plotting particle size (μm) as a function of CS:CMC (w/w) ratio.

Equal amounts (typically 100-200 mL) of 3% CS and 3% CMC solutions described above were mixed in a commercial blender and blended at a rate of 25,000 RPM for 0.5 min to 15 min. Solutions used for coating were blended for 3 minutes. The purpose of blending the solutions at various times was to control the particle size or viscosity of the final solution. FIG. 1 depicts a plot of particle size as a function of blend time. Higher blend times result in smaller particle sizes. FIG. 2 depicts particle size as a function of CS:CMC (w/w) ratio.

Finally, the CS:CMC ratio controlled whether the particle is anionic or cationic. Streaming potential measurements on films of the polymer blends revealed that 1:1 CS:CMC blends exhibit a zeta potential of approximately 60-65 mV (cationic) where 1:1.5 CS:CMC blends exhibit a zeta potential of approximately −30 mV (anionic). This flexibility allowed the zeta potential of polymer blend particles to be varied over a wide range of positive and negative values.

Example 2—Commercial Copy Paper with a Substrate Density of $9.5 \times 10^4$ g/mm$^3$ Commercial copy paper sheets with a density of $9.5 \times 10^{-4}$ g/mm$^3$ (American Eagle Paper Mills, 20 lb stock) were sprayed with 3-6 mL of the 3% CS:CMC polymer blend solution. This was done by spraying the solution for 2-3 seconds with a pressurized spray gun that dispenses approximately 1-2 mL of solution per second. The coated sheet was then exposed to 110° C. for 30 minutes. Each coated sample was then subjected to wet tensile testing, liquid penetration testing, and water vapor permeability testing. Table 2 summarizes improved performance as shown by tensile testing performed on a TA Instruments Q-800 Dynamic Mechanical Analyzer. In this case, tests were run with a preload force of 0.1 Newtons, isothermal temperature of 25° C., soak time equal to 25 minutes, and a force ramp of 0.01 Newtons per minute until the sample broke. Each sample was then tested at the same conditions except an increase in isothermal temperature to 80° C. Substantial improvements were observed for the samples coated with the polymer blend.

TABLE 2

Tensile test analysis on coated and uncoated commercial copy paper.

| | | Mechanical Analysis | |
|---|---|---|---|
| | | Coated Copy Paper | Uncoated Copy Paper |
| 25° C. | Stress at break | 1.8 MPa | 0.5173 MPa |
| | Strain at break | 3.50% | 0.65% |
| 80° C. | Stress at break | 0.61 MPa | 0.08 Mpa |
| | Strain at break | 4.40% | 2.02% |

Table 3 summarizes penetration time of a solution of water where the pH was adjusted to 3, 7, and 9 using acetic acid or sodium hydroxide. In this case, coated and non-coated samples were placed in a Nalgene 5311-0250 polycarbonate desiccator with 200 mL of water to prevent evaporation of the test liquid from the paper surface. 0.8 mL of deionized water was placed on the surface of each sample and observed for liquid penetration. The time to penetration was recorded when the bottom of the samples showed dampness. Dramatic improvement was observed for samples coated with the polymer blend.

TABLE 3

Liquid penetration time of coated and uncoated commercial copy paper samples.

| | | Penetration Time | |
|---|---|---|---|
| | Density of Substrate | With Coating 9.52E−4 g/mm3 | Without Coating 9.52E−4 g/mm3 |
| 25 C. | pH 3 | >120 hours | Instant |
| | pH 7 | >120 hours | Instant |
| | pH 9 | >120 hours | Instant |
| 80 C. | pH 3 | >120 hours | Instant |
| | pH 7 | >120 hours | Instant |
| | pH 9 | >120 hours | Instant |

Figure 3:
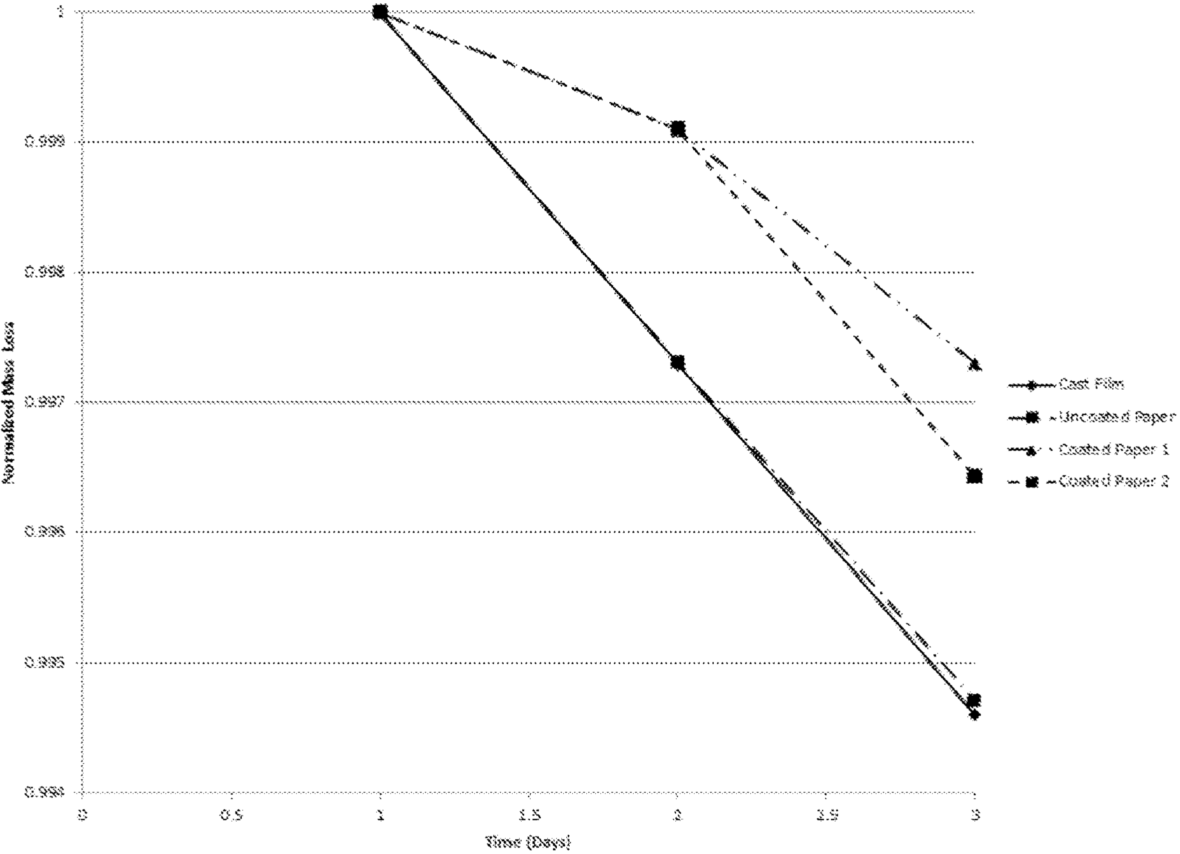
FIG. 3 is a graph plotting the normalized water mass loss as a function of time (days) for a paper substrate, a cast film, and two coated paper substrates used as barriers.

Polymer blend cast films and coated paper samples described above were prepared for water vapor permeability testing. Cast films were prepared by pipetting 15 mL of the 3% CS:CMC polymer blend into a petri dish and placing the dish containing the blend in a negative pressured environment at 25° C. for 24 hours to dehydrate. FIG. 3 illustrates a normalized graph of water vapor permeability for coated and uncoated substrates as well as two controls including no substrate and the CS:CMC cast film. Water vapor transmission tests were run in an in-house developed chamber that follows the ASTM Standard E96-95. Mass losses were recorded over a three day period. Coated paper samples exhibited lower mass loss and better vapor barrier properties.

Figure 4:
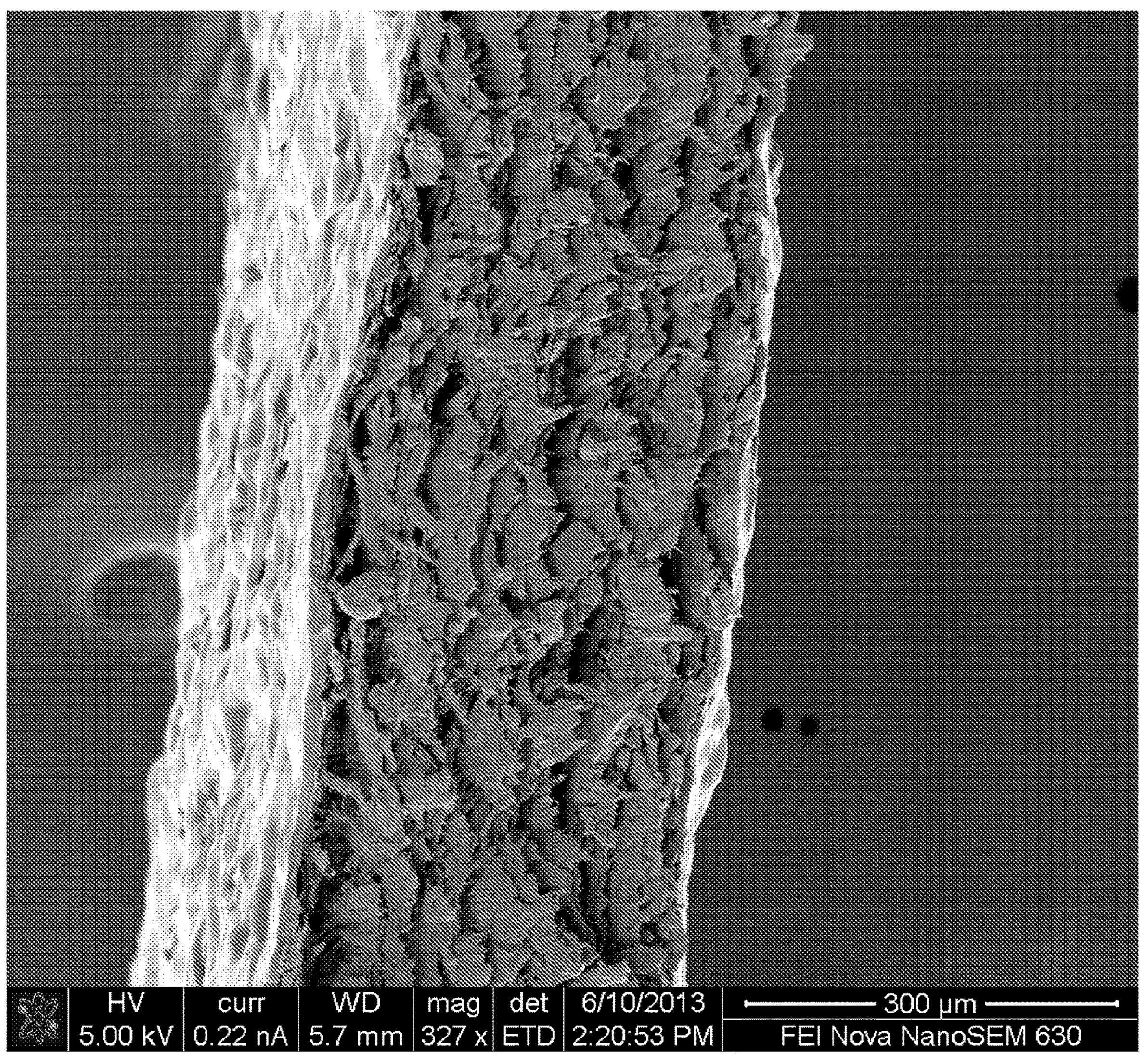
FIG. 4 is a scanning electron microscope image of a cross section of a cellulose sheet coated with a polymer blend. The polymer blend coating is clearly seen on the left surface and measures approximately 10-12 μm in thickness. The coating is continuous across the surface of the sheet.

FIG. 4 depicts a scanning electron microscope image of a cross section of a cellulose sheet coated with a polymer blend as described herein. The polymer blend coating was clearly seen on the left surface and measures approximately 10-12 microns in thickness. The coating was continuous across the surface of the sheet.

Example 4—Paperboard with Densities Between $6.3\times10^{-4}$ g/mm$^3$ and $8.7\times10^{-4}$ g/mm$^3$ Paperboard with densities between $6.3\times10^{-4}$ g/mm$^3$ and $8.7\times10^{-4}$ g/mm$^3$ were sprayed with 3-6 mL of the 3% CS:CMC polymer blend solution. This was done by spraying the solution for 2-3 seconds with a pressurized spray gun that dispenses approximately 1-2 mL of solution per second. The coated sheet was then exposed to 110° C. for 30 minutes. Each coated sample was then subjected to wet tensile testing and liquid penetration testing. Table 4 summarizes improved performance as shown by tensile testing performed on a TA Instruments Q-800 Dynamic Mechanical Analyzer. In this case, tests were run with a preload force of 0.1 Newtons, isothermal temperature of 25° C., soak time equal to 25 minutes, and a force ramp of 0.01 Newtons per minute until the sample broke. Each sample was then tested at the same conditions except an increase in isothermal temperature to 80° C.

TABLE 4 tensile test analysis on three different coated and uncoated paper boards.

| | Dynamic Mechanical Analysis | | | | | |
|---|---|---|---|---|---|---|
| | With Coating | | | Without Coating | | |
| | Substrate A | Substrate B | Substrate C | Substrate A | Substrate B | Substrate C |
| Density of Substrate | 8.67 × 10^−4 g/mm3 | 6.56 × 10^−4 g/mm3 | 6.33 × 10^−4 g/mm3 | 8.67 × 10^−4 g/mm3 | 6.56 × 10^−4 g/mm3 | 6.33 × 10^−4 g/mm3 |
| 25 C. Stress at Break | 1.034 MPa | 1.219 MPa (10.4%) | 1.857 MPa | 1.406 MPa | 2.038 MPa | 2.175 MPa |
| Strain at Break | 7.95% | 5.29% | 13.59% | 1.347% | 1.37% | 1.451% |
| 80 C. Stress at Break | 1.031 MPa | 0.8566 MPa | 1.857 MPa | 0.8198 MPa | 1.254 MPa | 1.415 MPa |
| Strain at Break | 1.92% | 9.82% | 13.59% | 1.124% | 0.9942% | 1.0430% |

Table 5 summarizes penetration time of a solution of water where the pH was adjusted to 3, 7 and 9 using acetic acid or sodium hydroxide. In this case, coated and non-coated samples were placed in a Nalgene 5311-0250 polycarbonate desiccator with 200 mL of water to prevent evaporation of the test liquid from the paper surface. 0.8 mL of deionized water was placed on the surface of each sample and observed for liquid penetration. The time to penetration was recorded when the bottom of the samples showed dampness.

TABLE 5

Penetration time of three different coated and uncoated paper boards.

| | Penetration Time | | | | | |
|---|---|---|---|---|---|---|
| | With Coating | | | Without Coating | | |
| | Substrate A | Substrate B | Substrate C | Substrate A | Substrate B | Substrate C |
| Density of Substrate | 8.67 × 10^−4 g/mm3 | 6.56 × 10^−4 g/mm3 | 6.33 × 10^−4 g/mm3 | 8.67 × 10^−4 g/mm3 | 6.56 × 10^−4 g/mm3 | 6.33 × 10^−4 g/mm3 |
| 25 C. pH 7 | >30 hours | >30 hours | >30 hours | 2 min | 2 min | 2 min |
| pH 3 | >30 hours | >30 hours | >30 hours | 2 min | 2 min | 2 min |
| pH 9 | >30 hours | >30 hours | >30 hours | 2 min | 2 min | 2 min |
| 80 C. pH 7 | >30 hours | >30 hours | >30 hours | 2 min | 2 min | 2 min |
| pH 3 | >30 hours | >30 hours | ~25 hours | 2 min | 2 min | <1 min |
| pH 9 | >30 hours | >30 hours | >30 hours | 2 min | 2 min | 2 min |

Example 5—Pressed Paper Pulp Paperboard with a Density of $9.6\times10^{-4}$ g/mm$^3$ Pressed paper pulp paperboards with a density of $9.6\times10^{-4}$ g/mm$^3$ were sprayed with 3-6 mL of the 3% CS:CMC polymer blend solution. This was done by spraying the solution for 2-3 seconds with a pressurized spray gun that dispenses approximately 1-2 mL of solution per second. The coated sheet was then exposed to 110° C. for 30 minutes. Each coated sample was then subjected to wet tensile testing and liquid penetration testing. Table 6 summarizes improved performance as shown by tensile testing performed on a TA Instruments Q-800 Dynamic Mechanical Analyzer. In this case, tests were run with a preload force of 0.1 Newtons, isothermal temperature of 25° C., soak time equal to 25 minutes, and a force ramp of 0.01 Newtons per minute until the sample broke. Each sample was then tested at the same conditions except an increase in isothermal temperature to 80° C.

TABLE 6

Tensile test analysis on coated and uncoated paperboard.

| | | Mechanical Analysis | |
|---|---|---|---|
| | | Coated paperboard | Uncoated paperboard |
| 25° C. | Stress at break | 0.7 MPa | 1.329 Mpa |
| | Strain at break | 9.75% | 2.63% |
| 80° C. | Stress at break | 0.31 MPa | 0.2987 Mpa |
| | Strain at break | 8.98% | 11.76% |

Table 7 summarizes penetration time of a solution of water where the pH was adjusted to 3, 7, and 9 using acetic acid or sodium hydroxide. In this case, coated and non-coated samples were placed in a Nalgene 5311-0250 polycarbonate desiccator with 200 mL of water to prevent evaporation of the test liquid from the paper surface. 0.8 mL of deionized water was placed on the surface of each sample and observed for liquid penetration. The time to penetration was recorded when the bottom of the samples showed dampness.

TABLE 7

Penetration time for coated and uncoated samples.

| | | Penetration Time | |
|---|---|---|---|
| | Density of Substrate | With Coating 9.62E−4 g/mm3 | Without Coating 9.62E−4 g/mm3 |
| 25 C. | pH 3 | >120 hours | Instant |
| | pH 7 | >120 hours | Instant |
| | pH 9 | >120 hours | Instant |
| 80 C. | pH 3 | >120 hours | Instant |
| | pH 7 | >120 hours | Instant |
| | pH 9 | >120 hours | Instant |

Example 6—Nano-Cellulose-Biopolymer Blend Composite

Improvements in biopolymer coating performance can be achieved using nano-cellulose or cellulose nanowhiskers (CNWs) as an additional additive to the biopolymer blend. Nano-cellulose is cellulose processed to create isolated fibers with nanoscale diameters. Processing can include mechanical defibrillation and acid hydrolysis. Fiber dimensions can be about 100 nm to 5000 nm in length or more and approximately 3 nm to 50 nm in diameter. Improved biopolymer blends can be obtained through the following process.

Preparation of Cellulose Nanowhiskers 55 g of cotton cellulose was hydrolyzed with 500 me 63.5% (w/w) sulfuric acid (Mallinckrodt Baker) at a temperature of 45° C. for 90 min. The suspension was centrifuged (10 min, 8000×g), and the supernatant was replaced with DI water to remove excess acid. Centrifugation and washing steps were repeated until the pH of the solution reached 3. The pH of the suspension was brought up to 7 using 0.1 M potassium hydroxide (EMD Chemicals Inc.), and then the suspension was dialyzed against DI water. After that, a sonication step was applied to disperse the CNWs (Branson Model 5510, Danbury, 10 min). Several variations for this method can be used to provide different size distributions and purity.

Preparation of CS Solution

3% CS solution was made by adding 3 g chitosan (50-190 kDa, from Sigma-Aldrich) to 95.8 g of deionized water first, and then adding 1.2 g of formic acid (88%, Mallinckrodt Chemicals) drop wise into the mixture while magnetically stirring at 400 rpm. The mixture was stirred for one day to allow the chitosan to dissolve. The solution was sealed and stored in refrigerator. The pH of the 3% chitosan solution was around 3.

Preparation of CMC Solution

3% CMC solution was made by adding 3 g CMC (90 kDa, from Sigma-Aldrich) to 96.65 g of deionized water and magnetically stirring at 400 rpm for one day. The mixture was stirred for one day then supplemented with 0.35 g of formic acid. The solution was sealed and stored in refrigerator. The pH of the 3% CMC solution was around 3.

Preparation of CS-CNW-CMC Polymer Blend Coating Solution

A solution of anionic CNWs was added to a CS solution so that the final CS-CNW solution was 3% w/w CS in water) and the CNW content was 2% (1:50) to 20% (1:5) dry w/w CNW:CS. For samples prepared as described below, a CNW content of 7% w/w CNW:CS was used. The solution was mixed for 5 minutes to 30 minutes. This solution was then mixed with the 3% CMC solution in a commercial blender and blended at a rate of 25,000 RPM for 3 min.

As described herein, other anionic nano-materials can be used in this process. Other anionic nano-materials can be nano-clays or nano-minerals. These can be combined with the cationic polymer such as CS then combined with the anionic biopolymer such as CMC and vigorously blended. In some cases, a similar process can be used where a cationic nanomaterial can be combined with the anionic biopolymer then the mixture can be combined with the cationic biopolymer and vigorously blended.

Preparation of CS-CNW-CMC Coated Sheets

Paper sheets with a density of approximately $9.5\times10^{-4}$ $g/mm^3$ were sprayed with 3-6 mL of the 3% CS-CNW-CMC polymer blend solution. This was done by spraying the solution for 2-3 seconds with a pressurized spray gun that dispenses approximately 1-2 mL of solution per second. The coated sheet was then exposed to 110° C. for 30 minutes.

Testing of CS-CNW-CMC Coated Sheets

About 1 ml of solution consisting of water where the pH was adjusted from 3 to 9 using formic acid or sodium hydroxide was used. Samples exposed to 1 ml of solution at a pH of 3 and 7 resisted any liquid penetration for 47 hours. Samples exposed to 1 ml of solutions at a pH of 9 resisted any liquid penetration for 26 hours.

Example 7—Cellulose Sheets with Added Polymer Blends

Preparation of Pulp Solution

Cellulose pulp solution was made from blotting paper obtained from Dick Blick Art Materials (Galesburg, IL). Blotting paper was sectioned into small pieces and soaked in deionized water for 30 minutes. It was then blended in a conventional home blender for 15 sec and further stirred at 400 rpm for 7 days to get a homogenous 1% pulp solution.

Preparation of CS Solution

3% CS solution was made by adding 3 g chitosan (50-190 kDa, from Sigma-Aldrich) to 95.8 g of deionized water first, and then adding 1.2 g of formic acid (88%, Mallinckrodt Chemicals) drop wise into the mixture while magnetically stirring at 400 rpm. The mixture was stirred for one day to allow the chitosan to dissolve. The solution was sealed and stored in refrigerator. The pH of the 3% chitosan solution was around 3.

Preparation of CMC Solution

3% CMC solution was made by adding 3 g CMC (90 kDa, from Sigma-Aldrich) to 96.65 g of deionized water and magnetically stirring at 400 rpm for one day. The mixture was stirred for one day then supplemented with 0.35 g of formic acid. The solution was sealed and stored in refrigerator. The pH of the 3% CMC solution was around 3.

Preparation of CS+CMC Polymer Blend Solution

Equal amounts (typically 100-200 mL) of 3% CS and 3% CMC solutions described above were mixed in a commercial blender and blended at a rate of 25,000 RPM for 3 minutes. The purpose of blending the solutions at various times was to control the particle size or viscosity of the final solution.

Preparation of a Composite Containing the CS:CMC Blend

Cellulose composite sheets can be prepared by generally following the method described in TAPPI T 205 where the CS+CMC polymer blend solution is added to the pulp solution (to a loading of 1:100 to 100:100 (dry w/w blend to cellulose pulp) and mixed for 5 minutes to 2 hours before forming the composite sheets. In general, the composite sheets are made by pouring the CS+CMC+pulp solution into a 6 inch diameter cylinder measuring 18"-24" in length with a wire mesh covering the bottom of the cylinder. The cylinder is partially submerged into a water bath where the bottom % of the cylinder is filled with water when the pulp solution is poured into the cylinder without allowing the pulp solution to overfill the cylinder. After a few moments, the cylinder is slowly pulled from the water bath. As the water leaves the cylinder through the wire mesh, a composite sheet is formed on the surface of the mesh. The hydrated composite later is blotted dry with an absorbent sheet such as a paper towel, peeled from the wire mesh, and placed in a fixture for drying where the fixture holds the sheet to prevent the sheet from wrinkling during drying. Drying is performed at a temperature of 80° C. to 125° C. (e.g., 110° C.) for 10 minutes to 1 hour (e.g., 30 minutes). The CS-CNW-CMC blend also can be used in this manner.

Example 8—Polymer Blend-Clay Composite for Use as an Adhesive or Coating

Preparation of CS Solution

3% CS solution was made by adding 3 g chitosan (50-190 kDa, from Sigma-Aldrich) to 95.8 g of deionized water first, and then adding 1.2 g of formic acid (88%, Mallinckrodt Chemicals) drop wise into the mixture while magnetically stirring at 400 rpm. The mixture was stirred for one day to allow the chitosan to dissolve. The solution was sealed and stored in refrigerator. The pH of the 3% chitosan solution was around 3.

Preparation of CMC Solution

3% CMC solution was made by adding 3 g CMC (90 kDa, from Sigma-Aldrich) to 96.65 g of deionized water and magnetically stirring at 400 rpm for one day. The mixture was stirred for one day then supplemented with 0.35 g of formic acid. The solution was sealed and stored in refrigerator. The pH of the 3% CMC solution was around 3.

Preparation of CS+CMC Polymer Blend Solution

Equal amounts (typically 100-200 mL) of 3% CS and 3% CMC solutions described above were mixed in a commercial blender and blended at a rate of approximately 35,000 RPM for 30 minutes.

Preparation of Polymer Blend-Clay Composite

Sodium montmorillonite (sodium bentonite) powder (particle size ranging from about 1 micron to about 25 microns) is mixed with the CS+CMC polymer blend solution to a weight loading of 1:1 to 25:1 (e.g., 10:1 to 25:1) (dry w/w) clay:polymer for 5 min to 30 min (e.g., about 10 min). The composition can be then used directly as a coating for any application as described herein or dehydrated and used as a powder for any application as described herein. Powders can be rehydrated to a desired amount by adding water to the powder as desired and mixing.

Example 9—Casein Composite

Preparation of Pulp Solution

Pulp solution was made from blotting paper obtained from Dick Blick Art Materials (Galesburg, IL). Blotting paper was sectioned into small pieces and soaked in water for 30 minutes. It was then blended in a conventional home blender for 15 sec and further stirred at 400 rpm for 7 days to get a homogenous 2% pulp solution.

Preparation of Composite

Whole milk casein (Sigma Aldrich) is added to the pulp solution at a loading level of (25% w/w, dry weight casein: pulp) and stirred for 15 minutes. Optionally, powdered calcium carbonate is added to the solution at a loading of 10% w/w (dry weight calcium carbonate:pulp) and stirred for 15 minutes. The solution is then press molded where the mold is heated to a temperature of 90° C. until the sample is dehydrated to a level of less than 40% water content. In addition, the casein solution can be added to a calcium carbonate solution, mixed, and added to the pulp solution before pressing or other further processing.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A composition comprising a first substrate and a material comprising a plurality of associated particles, wherein said plurality of associated particles comprises one or more cationic polymers and one or more anionic polymers, wherein said cationic polymers and said anionic polymers were combined in a polar solution and vigorously blended such that the viscosity or particle size of the mixed polymers was reduced after blending, and wherein said material is disposed on a surface of said first substrate.

2. The composition of claim 1, wherein a cationic polymer of said one or more cationic polymers is a cationic polysaccharide, and/or wherein an anionic polymer of said one or more anionic polymers is an anionic polysaccharide.

3. The composition of claim 1, wherein a cationic polymer of said one or more cationic polymers is chitosan or a cationic starch.

4. The composition of claim 1, wherein an anionic polymer of said one or more anionic polymers is carboxymethyl cellulose or an anionic starch.

5. The composition of claim 1, wherein said polar solution comprises water and formic acid adjusted to a pH of about 3-4.

6. The composition of claim 1, further comprising a second substrate, wherein said material is disposed on a surface of said second substrate.

7. The composition of claim 6, wherein said first substrate and/or said second substrate is a paper substrate or a cellulose substrate.

8. The composition of claim 1, wherein a surface of each of said plurality of associated particles comprises positively charged and negatively charged end groups.

9. The composition of claim 1, wherein said material is insoluble in said polar solution.

10. The composition of claim 1, wherein said material further comprises one or more anionic nano-materials.

11. The composition of claim 1, wherein a cationic polymer of said one or more cationic polymers is chitosan, an anionic polymer of said one or more anionic polymers is carboxymethyl cellulose, and said first substrate is a paper substrate or a cellulose substrate.

12. A method for producing a composition, wherein said method comprises:

vigorously blending one or more cationic polymers and one or more anionic polymers in a polar solution to produce a solution, such that the viscosity or particle size of the mixed polymers is reduced after blending; and coating a first substrate with said solution to provide a material disposed on a surface of said first substrate, wherein said material comprises a plurality of associated particles, and wherein said plurality of associated particles comprises said one or more cationic polymers and said one or more anionic polymers.

13. The method of claim 12, wherein said solution further comprises one or more anionic nano-materials.

14. The method of claim 12, wherein an anionic nano-material of said one or more anionic nano-materials is nano-cellulose, a nano-clay, or a nano-mineral.

15. The method of claim 12, wherein a cationic polymer of said one or more cationic polymers is a cationic polysaccharide, and/or wherein an anionic polymer of said one or more anionic polymers is an anionic polysaccharide.

16. The method of claim 15, wherein said cationic polysaccharide is chitosan or a cationic starch.

17. The method of claim 12, wherein an anionic polymer of said one or more anionic polymers is an anionic polysaccharide.

18. The method of claim 17, wherein said anionic polysaccharide is carboxymethylcellulose or an anionic starch.

19. The method of claim 12, wherein said coating the first substrate comprises dehydrating said solution.

20. The method of claim 12, wherein said coating the first substrate comprises pressing said first substrate.

* * * * *